(12) United States Patent
Han et al.

(10) Patent No.: US 9,421,624 B2
(45) Date of Patent: Aug. 23, 2016

(54) END MILL FOR CUTTING OF HIGH-HARDNESS MATERIALS

(75) Inventors: Gang Han, Dusseldorf (DE);
Katsutoshi Maeda, Kusatsu (JP)

(73) Assignee: HITACHI TOOL ENGINEERING, LTD., Tokyo (JP)

( * ) Notice: Subject to any disclaimer, the term of this patent is extended or adjusted under 35 U.S.C. 154(b) by 251 days.

(21) Appl. No.: 13/985,408

(22) PCT Filed: Jan. 27, 2012

(86) PCT No.: PCT/JP2012/051758
§ 371 (c)(1),
(2), (4) Date: Sep. 5, 2013

(87) PCT Pub. No.: WO2012/111405
PCT Pub. Date: Aug. 23, 2012

(65) Prior Publication Data
US 2014/0003873 A1 Jan. 2, 2014

(30) Foreign Application Priority Data

Feb. 16, 2011 (JP) .................. 2011-030645
Jun. 28, 2011 (JP) .................. 2011-142663
Dec. 16, 2011 (JP) .................. 2011-275595

(51) Int. Cl.
*B23C 5/10* (2006.01)
(52) U.S. Cl.
CPC .............. *B23C 5/1009* (2013.01); *B23C 5/10* (2013.01); *B23C 2210/0435* (2013.01); *B23C 2210/082* (2013.01); *B23C 2210/084* (2013.01);
(Continued)

(58) Field of Classification Search
CPC .................. B23C 5/10; B23C 5/1009; B23C 2210/0435; B23C 2210/084; Y10T 407/1946; Y10T 407/1948; Y10T 407/1962; Y10T 407/1964
See application file for complete search history.

(56) References Cited

U.S. PATENT DOCUMENTS 5,626,446 A * 5/1997 Ching ......................... 408/1 R
7,125,210 B2 * 10/2006 Kolker et al. ............... 409/234
(Continued)

FOREIGN PATENT DOCUMENTS

CA    2578774 A1 *  3/2006 .............. B23C 5/10
CA    2534144 A1 *  7/2007 .............. B23C 5/02
(Continued)

OTHER PUBLICATIONS

Nov. 19, 2014 Extended Search Report issued in European Application No. 12747476.5.
(Continued)

*Primary Examiner* — Sunil K Singh
*Assistant Examiner* — Donte Brown
(74) *Attorney, Agent, or Firm* — Oliff PLC

(57) ABSTRACT

The present invention relates to an end mill, which comprises a bottom edge, which is composed of an arc-shaped cutting edge that is curved when seen from a direction perpendicular to the tool axis and a linear or curved medium-to-low inclination cutting edge, and a peripheral edge, wherein, when seen from a direction parallel to the tool axis, the arc-shaped cutting edge and a rim at the rearward side of the rotation at a flank of the arc-shaped cutting edge are curved with radii of curvatures, and the radius of curvature of the arc-shaped cutting edge is smaller than the radius of curvature of the rim at the rearward side of the rotation at the flank of the arc-shaped cutting edge.

13 Claims, 15 Drawing Sheets

(52) U.S. Cl.
    CPC ...... *B23C2210/205* (2013.01); *B23C 2210/54* (2013.01); *Y10T 407/1948* (2015.01); *Y10T 407/1964* (2015.01)

(56) References Cited

U.S. PATENT DOCUMENTS

| | | | |
|---|---|---|---|
| 7,431,538 B1 * | 10/2008 | Ni et al. | 407/53 |
| 2003/0235479 A1 * | 12/2003 | Chihara et al. | 409/132 |
| 2005/0186037 A1 | 8/2005 | Svensson | |
| 2009/0252564 A1 * | 10/2009 | Volokh et al. | 407/11 |
| 2010/0143052 A1 * | 6/2010 | Aoki et al. | 407/54 |

FOREIGN PATENT DOCUMENTS

| | | | | | |
|---|---|---|---|---|---|
| DE | 9303053 U1 | * | 4/1994 | ............... | B23C 5/10 |
| DE | 10 2007 034087 A1 | | 1/2009 | | |
| GB | 1018297 A | * | 1/1966 | ............... | B23C 5/10 |
| GB | 2405365 A | * | 3/2005 | ............... | B23C 5/00 |
| JP | 55037232 A | * | 3/1980 | ............... | B23C 5/10 |
| JP | S58-177213 A | | 10/1983 | | |
| JP | 02180518 A | * | 7/1990 | ............... | B23C 5/10 |
| JP | 03060909 A | * | 3/1991 | ............... | B23C 5/10 |
| JP | 04146017 A | * | 5/1992 | ............... | B23C 5/10 |
| JP | 09267211 A | * | 10/1997 | ............... | B23C 5/10 |
| JP | 10263913 A | * | 10/1998 | ............... | B23C 5/10 |
| JP | 11090721 A | * | 4/1999 | ............... | B23C 5/10 |
| JP | 2001001208 A | * | 1/2001 | ............... | B23C 5/10 |
| JP | 2001071209 A | * | 3/2001 | ............... | B23C 5/10 |
| JP | 2002187011 A | * | 7/2002 | ............... | B23C 5/10 |
| JP | 2002292515 A | * | 10/2002 | ............... | B23C 5/10 |
| JP | 2003225821 A | * | 8/2003 | ............... | B23C 5/10 |
| JP | 2003225822 A | * | 8/2003 | ............... | B23C 5/10 |
| JP | 2003326414 A | * | 11/2003 | ............... | B23C 5/10 |
| JP | A-2003-326414 | | 11/2003 | | |
| JP | 2004050338 A | * | 2/2004 | ............... | B23C 5/10 |
| JP | 2004141975 A | * | 5/2004 | ............... | B23C 5/10 |
| JP | 2004188516 A | * | 7/2004 | ............... | B23C 5/10 |
| JP | 2005028519 A | * | 2/2005 | ............... | B23C 5/10 |
| JP | A-2005-034982 | | 2/2005 | | |
| JP | A-2005-052924 | | 3/2005 | | |
| JP | A-2005-096048 | | 4/2005 | | |
| JP | 2005118960 A | * | 5/2005 | ............... | B23C 5/10 |
| JP | 2006212744 A | * | 8/2006 | ............... | B23C 5/10 |
| JP | 2007030074 A | * | 2/2007 | ............... | B23C 5/10 |
| JP | 2008036722 A | * | 2/2008 | ............... | B23C 5/10 |
| JP | A-2008-264966 | | 11/2008 | | |
| JP | 2009056533 A | * | 3/2009 | ............... | B23C 5/10 |
| JP | A-2009-056559 | | 3/2009 | | |
| JP | A-2009-532222 | | 9/2009 | | |
| JP | 2010162677 A | * | 7/2010 | ............... | B23C 5/10 |
| WO | WO 2007/113812 A2 | | 10/2007 | | |
| WO | WO 2009028216 A1 | * | 3/2009 | ............... | B23C 5/10 |
| WO | 2010/047428 A1 | | 4/2010 | | |
| WO | WO 2010047428 A1 | * | 4/2010 | ............... | B23C 5/10 |
| WO | WO 2013118829 A1 | * | 8/2013 | ............... | B23C 5/10 |

OTHER PUBLICATIONS

International Search Report issued in International Application No. PCT/JP2012/051758 issued on Feb. 21, 2012.

International Preliminary Report on Patentability issued in International Application No. PCT/JP2012/051758 issued on Aug. 21, 2013.

\* cited by examiner (a)  (b)

END MILL FOR CUTTING OF HIGH-HARDNESS MATERIALS

TECHNICAL FIELD

The present invention relates to an end mill for cutting of high-hardness materials.

BACKGROUND ART

In recent years, there has been an increase in demand for shortening the delivery time of molds, and thus, a highly efficient process for preparing molds has been desired. For the high-efficiency roughing of molds, ball end mills and radius end mills are widely in use. However, in a ball end mill, because the cutting amount in the vicinity of the central part becomes large, cutting rate does not increase, leading to inferior machinability. In addition, there is a disadvantage in that the chip pocket in the vicinity of the central part is small, and chip removal is poor. Therefore, recently, radius end mills are used more often for the high-efficiency roughing of molds. By using a radius end mill, because the cutting amount at the outer periphery becomes larger, the chip pocket becomes wider. Thus, chip removability becomes good, and cutting is performed at high-speed cutting part of the end mill, enabling highly efficient roughing, compared to the ball end mill.

However, lately, with the use of new molding materials and request for enhanced molding efficiency, demands regarding the durability of molds are increasing. Therefore, there is a growing interest in the adoption of high-hardness mold materials, which show much higher hardness than regular mold materials. In the high-efficiency roughing of such high-hardness mold materials, there is a problem in that fractures tend to occur, and that abrasion progress more quickly, even with the use of conventional radius end mills. Furthermore, vibration is more likely to occur during cutting, particularly when machining corners of the mold, and so far, adequate service life and stability has not yet been attained.

In order to suppress end mill abrasion during cutting of such high-hardness materials, to enhance fracture resistance, and to suppress vibration during cutting, to thereby achieve highly efficient and stable machining, several propositions, including a radius end mill, have been made.

In Patent Document 1, a face mill, in which the cutting part of the bottom edge is arc-shaped, arching along at least part of the length of the tool, when seen from the tool end, is disclosed, so as to enhance the metal removal rate and suppress tool abrasion, to thereby lengthen the tool life.

In Patent Document 2, an ellipsoidal end mill, wherein an approximately partial ellipsoidal cutting edge is formed at the tip of a tool body that rotates around a shaft center, and the focus of said ellipse is in an approximately symmetrical position from the shaft center, and at least part of said cutting edge is composed of a super-hard material, is disclosed.

In Patent Document 3, a face mill for the purpose of high feed rate machining and high-efficiency machining, wherein the cutting edge of the end mill is composed of a peripheral edge, an arc-shaped bottom edge, and an arc-shaped corner R edge that connects them, is disclosed.

In Patent Document 4, a cemented carbide solid end mill comprising a plurality of corner edges, wherein said corner edge is composed of a main corner edge 1 that forms the rotational trajectory of said end mill and a sub-corner edge 2 that is undersized compared to said rotational trajectory, wherein said main corner edge is arc-shaped, said sub-corner edge is of the same or smaller arc-shape than said main corner edge and 0.5% to 10% undersized than the cutting diameter forming said rotational trajectory, is disclosed.

PRIOR ART DOCUMENTS

Patent Documents

[Patent Document 1] JP-A-2009-532222
[Patent Document 2] JP-A-2003-326414
[Patent Document 3] U.S. Pat. No. 7,125,210
[Patent Document 4] JP-A-2005-52924

SUMMARY OF THE INVENTION

Problems to be Solved by the Invention

In recent years, in the field of mold machining, high-efficiency cutting is in greater demand. However, there is a problem in that the life of the end mill becomes extremely short for the high-efficiency roughing of high-hardness mold materials. The cause of such problem lies in that the cutting heat of the end mill tends to increase during high-efficiency roughing of high-hardness materials, and abrasions progress more quickly. Moreover, fractures caused by impact to the edge are more likely to occur, which leads to a shortened tool life. Further, when machining corners and performing machining that requires long overhang, fractures of the edge tend to occur, due to end mill vibration. Hence, because the tool life of the end mill becomes extremely short in the roughing of high-hardness materials, there is a problem in that it is difficult to achieve high-efficiency cutting with long tool life.

In the end mill disclosed in Patent Document 1, although the fracture resistance of the end mill was enhanced by the design of its edge, one of the objects of the present invention, which is the cutting of corners of high-hardness material molds and machining with long overhang, fractures of the end mill tend to occur because vibration cannot be sufficiently suppressed.

In the end mill disclosed in Patent Document 2, due to the ellipsoidal design of the bottom edge, the strength of the edge becomes strong, and fracture resistance is enhanced. However, because the length of the edge in contact with the work material is long, the cutting resistance becomes large, and there is a danger of fractures occurring. Thus, there was a problem in that tool life is shortened during the cutting of high-hardness materials.

In the end mill disclosed in Patent Document 3, due to the arc-shaped bottom edge, abrasion resistance of the edge in high-efficiency roughing can be attained. However, as with Patent Document 1, in the machining of mold corners and machining with long overhang, there was a problem in that vibration cannot be sufficiently suppressed, leading to fractures.

In the end mill disclosed in Patent Document 4, because the sub-corner edge is undersized, the edges in simultaneous contact during the machining of mold corners decrease, thereby being effective in suppressing vibration. However, in a radius end mill, because the bottom edge and the peripheral edge come in contact at a single arc-shaped corner R edge, the chips become thick, causing cutting heat to rise during the cutting of high-hardness materials. Hence there was a problem in that abrasion progress quickly, causing tool life to become short.

In view of the above-described problems, the problem that the present invention aims to solve is to provide an end mill with edges that show superior fracture resistance and abrasion resistance, which can suppress vibration in the machining of mold corners and in the machining with long overhang, which can also achieve long life and stable machining, which were not possible conventionally, even in high-efficiency machining.

Means to Solve the Problem

In order to attain the above-described object, the present inventors examined the optimal form of the cutting edge by making changes to the form of the bottom edge of the end mill, and repeatedly performing cutting tests and evaluations. As a result, it was discovered that, in order to solve the above-described problems regarding the cutting of high-hardness materials, the creation of a bottom edge with a novel form that differs from those of conventional end mills was important.

Thus, the present invention provides an end mill, which comprises a bottom edge, which is composed of an arc-shaped cutting edge that is curved when seen from a direction perpendicular to the tool axis and a linear or curved medium-to-low inclination cutting edge that is consecutive to the arc-shaped cutting edge, and a peripheral edge, wherein when seen from a direction parallel to the tool axis, the arc-shaped cutting edge and a rim at the rearward side of the rotation at a flank of the arc-shaped cutting edge are curved with radii of curvatures, and the radius of curvature of the arc-shaped cutting edge is smaller than the radius of curvature of the rim at the rearward side of rotation at the flank of the arc-shaped cutting edge.

In the cemented carbide end mill of the present invention, it is preferable that, when seen from a direction parallel to the tool axis, the radius of curvature of the arc-shaped cutting edge is larger than the tool radius.

In the cemented carbide end mill of the present invention, it is preferable that, when seen from a direction parallel to the tool axis, the radius of curvature of the arc-shaped cutting edge is in the range of 0.3 times or above to 0.7 times or below the radius of curvature of the rim at the rearward side of the rotation at the flank of the arc-shaped cutting edge.

In the cemented carbide end mill of the present invention, it is preferable that, when seen from a direction parallel to the tool axis, the radius of curvature of the arc-shaped cutting edge is in the range of 1.1 times or above to 1.5 times or below the tool radius.

In the cemented carbide end mill of the present invention, it is preferable that, when seen from a direction parallel to the tool axis, the radius of curvature of the rim at the rearward side of the rotation at the flank of the arc-shaped cutting edge is in the range of 2 times or above to 4 times or below the tool radius.

In the cemented carbide end mill of the present invention, it is preferable that it comprises a plurality of peripheral edges each consisting of a main peripheral edge that is provided at a position that is relatively on the outer peripheral side and a sub-peripheral edge that is provided at a position that is relatively on the inner circumference side, and a plurality of bottom edges each consisting of a main bottom edge with a relatively long length from the tool axis, and a sub-bottom edge with a relatively short length from the tool axis, wherein the main bottom edge is composed of an arc-shaped cutting edge that has a radius of curvature that is 1.5 times or above to 5 times or below the tool radius and a medium-to-low inclination cutting edge that stretches from the end of the arc-shaped cutting edge toward the tool axis, and the sub-bottom edge and the sub-peripheral edge are provided at a direction perpendicular to the tool axis from the main bottom edge and the main peripheral edge, respectively, at a position undersized in the range of 0.0025 times or above to 0.01 times or below from the tool diameter.

In the cemented carbide end mill of the present invention, it is preferable that the position of the center of the arc that constitutes the arc-shaped cutting edge at the main bottom edge, when seen from a direction perpendicular to the tool axis, is in the range of 0.05 times or above to 0.25 times or below the tool diameter, when measured from the tool axis in a direction perpendicular to the tool axis.

In the cemented carbide end mill of the present invention, it is preferable that the ratio of the length of the arc-shaped cutting edge at the bottom edge and the tool radius, when measured at a direction perpendicular to the tool axis, is at least 50% or above to 90% or below the tool radius for the length of the arc-shaped cutting edge of the main bottom edge.

In the cemented carbide end mill of the present invention, it is preferable that the radius of curvature of the arc that constitutes the arc-shaped cutting edge at the main bottom edge is equal to the radius of curvature of the arc that constitutes the arc-shaped cutting edge of the sub-bottom edge.

In the cemented carbide end mill of the present invention, it is preferable that each bottom edge and peripheral edge are connected via an approximately arc-shaped R edge.

In the cemented carbide end mill of the present invention, it is preferable that the radius of curvature of the R edge is in the range of 0.02 times or above to 0.2 times or below the tool radius.

In the cemented carbide end mill of the present invention, it is preferable that each bottom edge and peripheral edge are connected via a chamfer end cutting edge.

In the cemented carbide end mill of the present invention, it is preferable that the width of the chamfer end cutting edge is in the range of 0.02 times or above to 0.2 times or below the tool radius.

Effect of the Invention

In the end mill of the present invention, when seen from a direction parallel to the tool axis, the arc-shaped cutting edge and the rim at the rearward side of the rotation at the flank of the arc-shaped cutting edge form curves with radii of curvatures, and the radius of curvature of the arc-shaped cutting edge is smaller than the radius of curvature of the rim at the rearward side of the rotation at the flank of the arc-shaped cutting edge. Therefore, chip removability is enhanced. Further, the width of the flank of the arc-shaped cutting edge becomes narrower as it approaches the center of the tool axis, and the flank becomes wider at the outer periphery. Therefore, the rigidity of the edge on the outer periphery increases, allowing higher cutting rate and cutting at higher feed rate. Thus, the enhancement of cutting efficiency is enabled.

In the present invention, it is preferable that, when seen from a direction parallel to the tool axis, the radius of curvature of the arc-shaped cutting edge is larger than the tool radius. This allows the flank at the outer periphery to become wider, which allows the width of the flank at the outer-most periphery of the tool, i.e., the connective part of the arc-shaped cutting edge and the peripheral edge, where the cutting resistance is at its maximum, to be largest. Therefore, the rigidity of the connective part of the arc-shaped cutting edge and the peripheral edge is further enhanced, enabling stable cutting without fractures even during high-efficiency cutting.

In the present invention, it is preferable that the radius of curvature of the arc-shaped cutting edge is in the range of 0.3 times or above to 0.7 times or below the radius of curvature of the rim at the rearward side of the rotation at the flank of the arc-shaped cutting edge. This further allows chip removability to increase, enabling high-efficiency machining of 1.5 times or above, compared to conventional end mills, even in the roughing of molds with corners made of high-hardness materials of 60HRC.

Furthermore, it is preferable that the radius of curvature of the arc-shaped cutting edge is in the range of 1.1 times or above to 1.5 times or below the tool radius. This allows a tool life of 1.5 times or above that of conventional end mills, even in the roughing of molds with corners made of high-hardness materials of 60HRC.

In the present invention, it is preferable that, when seen from a direction parallel to the tool axis, the radius of curvature of the rim at the rearward side of the rotation at the flank of the arc-shaped cutting edge is in the range of 2 times or above to 4 times or below the tool radius. This allows the width of the flank at the outer periphery to become wider, enhancing rigidity, and thereby enables stable machining without edge fractures at the outer periphery, even while machining under high-efficiency conditions.

The end mill of the present invention is composed of a main peripheral edge that is provided at a position that is relatively on the outer peripheral side and a sub-peripheral edge that is provided at a position that is relatively on the inner circumference side, and the main bottom edge is composed of an arc-shaped cutting edge that has a radius of curvature that is 1.5 times or above to 5 times or below the tool radius, and a medium-to-low inclination cutting edge that stretches from an end of the arc-shaped cutting edge toward the center of the tool axis. Therefore, the chips that develop during cutting become thin, reducing cutting resistance and impact. Thus, abrasion resistance and fracture resistance is enhanced. Further, since the chips become thinner, cutting heat can be suppressed, allowing further enhancement of abrasion resistance. This enables higher feed rate, allowing enhancement of efficiency. Thus, high-efficiency machining of 1.5 times or above compared to conventional end mills, can be achieved, even in the roughing of molds with corners made of high-hardness materials of 60HRC.

In the present invention, the sub-bottom edge and the sub-peripheral edge are provided at a direction perpendicular to the tool axis from the main bottom edge and main peripheral edge, respectively, at a position undersized in the range of 0.0025 times or above to 0.01 times or below from the tool diameter. Therefore, vibration can be suppressed and extremely stable machining is made possible, even in the machining of corners, which is essential in mold machining. More specifically, a tool life of 1.5 times or above that of conventional end mills without fractures, even in the high-efficiency roughing of molds with corners made of high-hardness materials of 60HRC, can be achieved.

In the present invention, by setting the position of the center of the arc that constitutes the arc-shaped cutting edge in the main bottom edge, when seen from a direction perpendicular to the tool axis, in the range of 0.05 times or above to 0.25 times or below the tool diameter, when measured from the tool axis in a direction perpendicular to the tool axis, the end mill can avoid cutting with the edges at the central part and its vicinity where the cutting rate becomes zero. Further, even when a much larger cutting depth is set, because cutting can be performed with just the bottom edge, the actual thickness of the chip that develops during cutting becomes thin, and a high-efficiency stable cutting is attained, compared to conventional end mills.

In the present invention, because the radius of curvature of the arc that constitutes the arc-shaped cutting edge of the main bottom edge is equal to the radius of curvature of the arc that constitutes to arc-shaped cutting edge of the sub-bottom edge, the load on the entire bottom edge becomes uniform, allowing a more stable machining.

In the present invention, it is preferable that the bottom edge and the peripheral edge are connected via an approximately arc-shaped R edge, and that the radius of curvature of the R edge is in the range of 0.02 times or above to 0.2 times or below the tool radius. Alternatively, it is preferable that the bottom edge and the peripheral edge are connected via a chamfer end cutting edge, and further, that the width of the chamfer end cutting edge is in the range of 0.02 times or above to 0.2 times or below the tool radius. The cutting rate is largest at the bottom edge on the peripheral edge side, and fractures are likely to occur, but by connecting the bottom edge and the peripheral edge via an R edge or a chamfer end cutting edge, even when the connective part between the peripheral edge and the bottom edge come in contact with the work material, fractures do not occur, and long-life machining is enabled.

Thus, the present invention provides an end mill that allows high-efficiency machining for molds with complex forms, and further, enables long life and stable machining even for high-hardness materials.

BEST MODE FOR CARRYING OUT THE INVENTION

Figure 1:
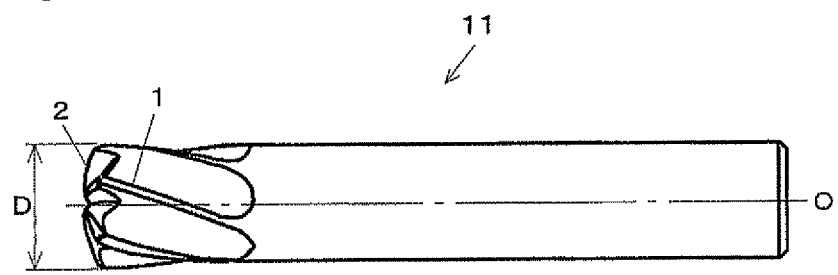
FIG. 1 is a front view of one example of the end mill of the present invention.

As a typical embodiment of the present invention, the end mill of the present invention is described with reference to FIGS. 1 to 9. FIG. 1 is a front view of one example of the end mill of the present invention. As shown in FIG. 1, the end mill of the present invention 11 is composed of a peripheral edge 1 and a bottom edge 2 that is provided on the end face at the tip. The end mill of the present invention 11 is normally used in contour machining and cutting is performed using, mainly, the bottom edge 2.

Figure 2:
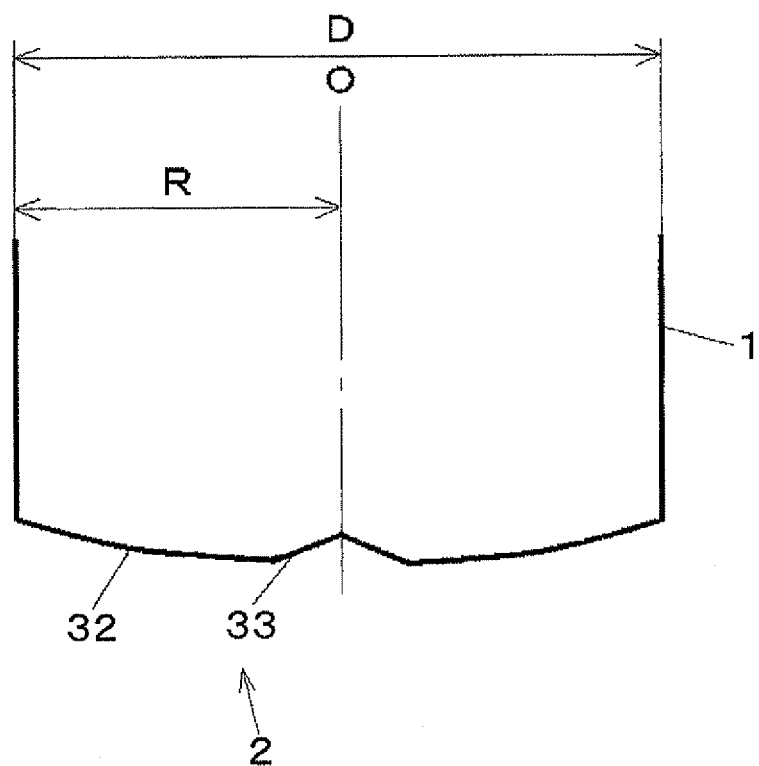
FIG. 2 is an enlarged view of the vicinity of the tip of the end mill of FIG. 1, seen from a direction perpendicular to the tool axis.

FIG. 2 is an enlarged view of the vicinity of the tip of the end mill of FIG. 1, when seen from a direction perpendicular to the tool axis. In the present invention, the cutting edge are composed of a bottom edge 2, which is composed of a mainly curved arc-shaped cutting edge 32 and a medium-to-low inclination cutting edge 33 that is consecutive to the arc-shaped cutting edge 32, and a peripheral edge 1. Since the end mill of the present invention is used in contour machining of molds etc., cutting is performed using the bottom edge 2. Here, although the bottom edge 2 is composed of an arc-shaped cutting edge 32 and a medium-to-low inclination cutting edge 33, the arc-shaped cutting edge 32 is mainly used for cutting.

Figure 3:
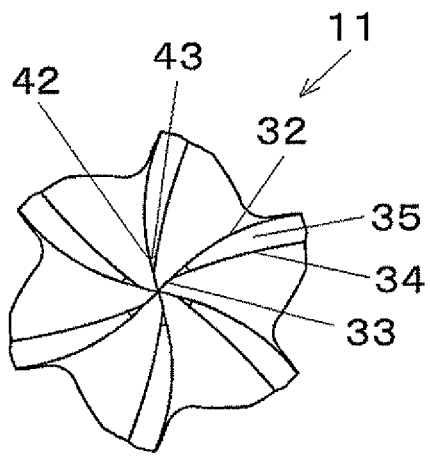
FIG. 3 is an enlarged view of the bottom edge of the end mill of FIG. 1, seen from a direction parallel to the tool axis.

FIG. 3 is an enlarged view of the bottom edge of the end mill of FIG. 1, when seen from a direction parallel to the tool axis. The bottom edge of the end mill of the present invention 11 is composed of an arc-shaped cutting edge 32 and a medium-to-low inclination cutting edge 33. The arc-shaped cutting edge 32 is formed of an gash and a flank of the arc-shaped cutting edge 35, and the gash and flank of the arc-shaped cutting edge 35 positioned at the rearward side of the rotational of the arc-shaped cutting edge 32 are connected via a rim 34 at the rearward side of the rotation of the arc-shaped cutting edge. Further, the arc-shaped cutting edge 32 and the medium-to-low inclination cutting edge 33 are connected via a boundary of the arc-shaped cutting edge and medium-to-low inclination cutting edge 42. Similarly, the flank of the arc-shaped cutting edge 35 and the flank of the medium-to-low inclination cutting edge are connected via a boundary of the flank of the arc-shaped cutting edge and the flank of the medium-to-low inclination cutting edge 43.

Figure 4:
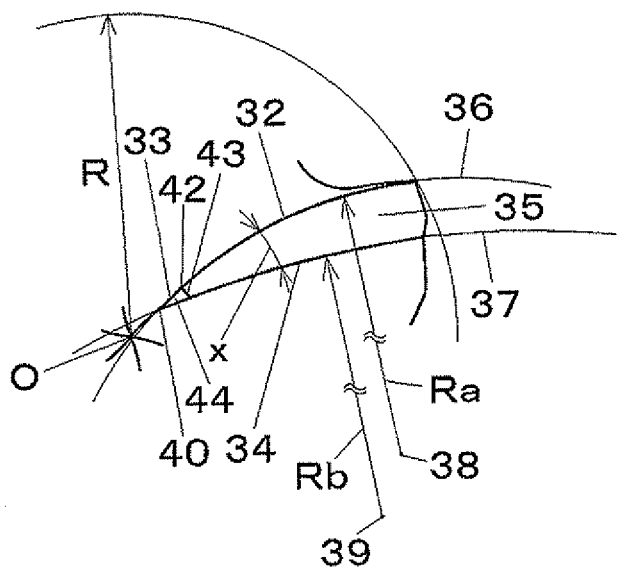
FIG. 4 is an enlarged view of the bottom edge of the end mill of FIG. 3.

FIG. 4 is an enlarged view of the bottom edge of the end mill of FIG. 3. As described above, in the end mill of the present invention, the arc-shaped cutting edge 32 and the medium-to-low inclination cutting edge 33 are connected via the boundary of the arc-shaped cutting edge and the medium-to-low inclination cutting edge 42, and the flank of the arc-shaped cutting edge 35 and the flank of the medium-to-low inclination cutting edge 44 are connected via the boundary of the flank of the arc-shaped cutting edge and the flank of the medium-to-low inclination cutting edge 43. That is, the arc-shaped cutting edge 32 is provided from the boundary of the arc-shaped cutting edge and the medium-to-low inclination cutting edge 42 to the connective part with the peripheral edge, and the medium-to-low inclination cutting edge 33 is provided from the boundary of the arc-shaped cutting edge medium-to-low inclination cutting edge 42 to the tool axis O.

Further, the radius of curvature of the arc-shaped cutting edge Ra (center of the arc 38), which refers to the radius of curvature of the arc-shaped cutting edge 32, is smaller than the radius of curvature of the rim at the rearward side of the rotation Rb (center of the arc 39), which is the radius of curvature of the rim at the rearward side of the rotation of the flank of the arc-shaped cutting edge 34. Thus, the ridge line of the arc-shaped cutting edge is provided so that it faces the outer periphery, and chips are removed toward the outer periphery. Therefore, the chips do not remain in the chip pocket of the end mill, and stable machining is made possible.

As shown in FIG. 4, because the radius of curvature of the arc-shaped cutting edge Ra is smaller than the radius of curvature of the rim at the rearward side of the rotation of the flank of the arc-shaped cutting edge Rb, the width of the flank of the arc-shaped cutting edge x becomes wider as it approaches the outer periphery. Here, the width of the flank of the arc-shaped cutting edge x refers to the width of the flank of the arc-shaped cutting edge 35 measured along the direction of the rotation. When the width of the flank of the arc-shaped cutting edge x becomes wider, the rigidity of the edge is enhanced, and the edge is less likely to fracture. When cutting with an end mill, cutting is generally performed at a constant rotational frequency. When the rotational frequency is the same, the cutting rate at the center of the end mill is slower and the cutting rate at the peripheral side is faster. In the configuration of the present invention, the width of the flank of the arc-shaped cutting edge x is designed to be wider at the peripheral side, where the cutting rate is faster and fracture is more likely to occur, while the width of the flank of the arc-shaped cutting edge x is designed to be narrower at the center, where the cutting rate is slower and fracture is less likely to occur, and there is less need for rigidity. Thus, a large chip pocket is created, allowing optimum condition to be set, and machining under stable and highly-efficient cutting conditions is enabled. Here, the arc formed of the radius of curvature of the arc-shaped cutting edge 36 and the arc formed of the radius of curvature of the rim at the rearward side of the rotation of the flank of the arc-shaped cutting edge 37 preferably intersect at an intersection 40 that is provided near the end at the bottom edge center side.

Here, intersection 40 is the point at which the bottom edge and the rim of the flank of the arc-shaped cutting edge at the rearward side of the rotation intersect. Since the angle created by each ridgeline is an extremely acute angle, the rigidity of the edge becomes inferior. Thus, in contour machining, for which it is usually used, if the intersection 40 is in constant contact with the work material during cutting, chipping due to lack of rigidity may occur. Hence, intersection 40 should preferably be provided on the medium-to-low inclination cutting edge 33, which does not come in contact with the work material during contour machining. Further, when seen from a direction parallel to the tool axis, intersection 40 should be provided at a position where the distance from the tool axis O is 0.05 times or larger to 0.25 time or smaller the tool diameter D. It is more preferable to be set so that its distance from the tool axis O is 0.10 times or above to 0.25 times or below the tool diameter D.

Here the radius of curvature of the arc-shaped cutting edge Ra is preferably in the range of 0.3 times or above to 0.7 times or below the radius of curvature of the rim at the rearward side of the rotation of the flank of the arc-shaped cutting edge Rb. It has been confirmed that when the radius of curvature of the arc-shaped cutting edge Ra is smaller than 0.3 times the radius of curvature of the rim at the rearward side of the rotation Rb of the flank of the arc-shaped cutting edge, the width of the flank of the arc-shaped cutting edge at the outer-most periphery becomes insufficient, which causes a lack of rigidity, leading to a tendency of fractures to occur. It has also been confirmed that when the radius of curvature of the arc-shaped cutting edge Ra is larger than 0.7 times the radius of curvature of the rim at the rearward side of the rotation Rb of the flank of the arc-shaped cutting edge, it becomes difficult for the chip developed from the arc-shaped cutting edge to be removed toward the periphery, and fractures due to chip clogging is likely to occur.

In the present specification, when the end mill of the present invention is seen from a direction perpendicular to the tool axis of the end mill, as in FIG. 2, the medium-to-low inclination cutting edge 33 and the tool axis O are exemplified as being connected by one straight line. However, note that the same effects as those of the present invention are obtained, even when the medium-to-low inclination cutting edge 33 and the tool axis O are connected by a curve. Further, when the medium-to-low inclination cutting edge 33 is composed of a plurality of straight lines and curves via the intersection 40, for example, when the medium-to-low inclination cutting edge 33 is formed with a straight line from the boundary of the arc-shaped cutting edge and the medium-to-low inclination cutting edge 42 to the intersection 40, and a curve from the intersection 40 to the tool axis O, the same can be said.

Figure 5:
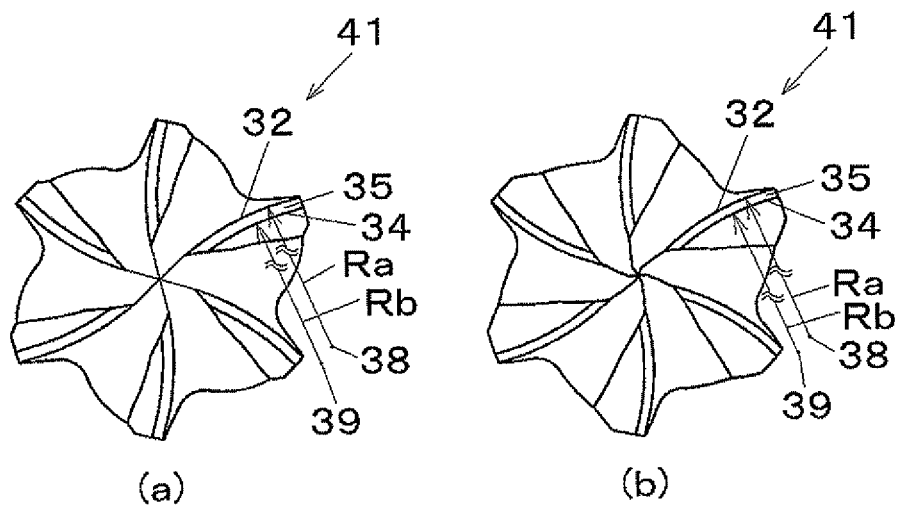
FIG. 5 shows a conventional end mill, wherein the radius of curvature of the arc-shaped cutting edge and the radius of curvature of the rim at the rearward side of the rotation at the flank of the arc-shaped cutting edge are the same.

FIG. 5 shows a conventional end mill, wherein the radius of curvature of the arc-shaped cutting edge and the radius of curvature of the rim at the rearward side of the rotation at the flank of the arc-shaped cutting edge are the same. In the conventional end mill 41 shown in FIG. 5, the radius of curvature of the arc-shaped cutting edge Ra and the radius of curvature of the rim at the rearward side of the rotation at the flank of the arc-shaped cutting edge Rb are of the same value. Further, a plane, which is different from the flank of the arc-shaped cutting edge 35, is provided between the flank of the arc-shaped cutting edge 35 and the gash provided at the rearward side of the rotation of the arc-shaped cutting edge 32. FIG. 5(a) is an example wherein the plane is provided as being relatively narrow. FIG. 5(b) is an example wherein the plane is provided as being relatively wide. As shown in FIG. 5, when the radius of curvature of the arc-shaped cutting edge Ra and the radius of curvature of the rim at the rearward side of the rotation at the arc-shaped cutting edge Rb are the same, the width of the flank of the arc-shaped cutting edge becomes uniform from the center to the periphery, and the rigidity of the edge becomes uniform, as well. As described above, the cutting rate is slower at the center of the end mill, and faster at the periphery. However, if the rigidity is uniform at the center and the periphery, the edge rigidity at the periphery would be insufficient, and thus, fractures are more likely to occur, making it difficult to perform high-efficiency machining.

Further, as shown in FIG. 5, in an end mill, when a plane that is different from the flank of the arc-shaped cutting edge 35 is formed between the flank of the arc-shaped cutting edge 35 and the gash provided at the rearward side of the rotation at the arc-shaped cutting edge 32, the chip pocket becomes narrow, causing chip clogging during high-efficiency cutting. In the present invention, as shown in FIG. 3 and FIG. 4, the flank of the arc-shaped cutting edge 35 and the gash are provided in a consecutive manner via a rim at the rearward side of the rotation at the flank of the arc-shaped cutting edge 34. That is, the two adjacent gashes are connected via one plane (the flank of the arc-shaped cutting edge 35), and thus, the chip pocket is wide and chips can be stably removed during cutting. Hence, high-efficiency cutting compared to the conventional end mill is made possible.

In the enlarged view of the bottom edge seen from a direction parallel to the tool axis of FIG. 4, when the radius of curvature of the arc-shaped cutting edge Ra is smaller than the tool radius R, the width of the flank of the arc-shaped cutting edge x at the outer-most periphery of the end mill is not wide enough, and thus, fractures due to lack of rigidity tend to occur. Hence, the radius of curvature of the arc-shaped cutting edge Ra should preferably be larger than the tool radius R.

Furthermore, the radius of curvature of the arc-shaped cutting edge Ra is preferably in the range of 1.1 times or above to 1.5 times or below the tool radius R. This allows a tool life of over 1.5 times that of the conventional end mill without fracture, in the high-efficiency roughing of molds containing corners made of high-hardness materials with a hardness of 60HRC or more. A slight decrease in tool life has been confirmed when the radius of curvature of the arc-shaped cutting edge Ra is not in the range of 1.1 times or above to 1.5 times or below the tool radius R.

Figure 6:
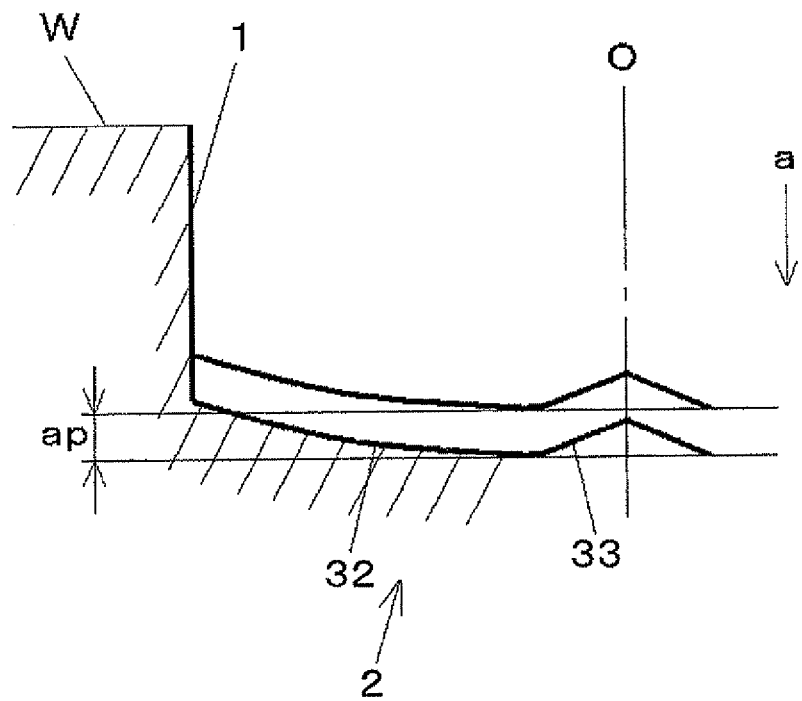
FIG. 6 is an enlarged view of the vicinity of the tip of the end mill, when machining a corner of a mold.
Figure 7:
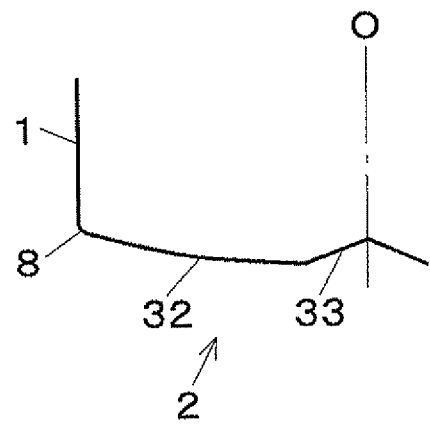
FIG. 7 shows an end mill, wherein the bottom edge and the peripheral edge are connected via an approximately arc-shaped R edge.
Figure 8:
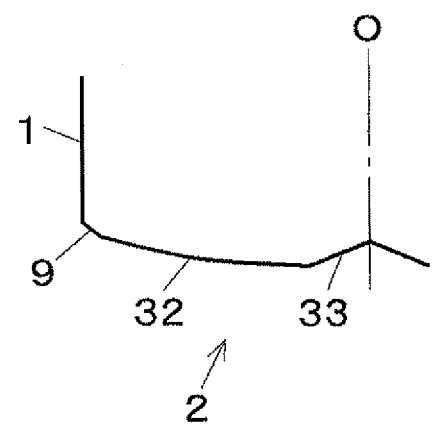
FIG. 8 shows an end mill, wherein the bottom edge and the peripheral edge are connected via a chamfer end cutting edge.

FIG. 6 is an enlarged view of the vicinity of the tip of the end mill when machining a corner of a mold. FIG. 7 shows an end mill, wherein the bottom edge and the peripheral edge are connected via an approximately arc-shaped R edge. FIG. 8 shows an end mill, wherein the bottom edge and the peripheral edge are connected via a chamfer end cutting edge. In the end mill of the present invention, the bottom edge 2 is mainly used for contour machining, but when machining the corner of molds etc., the whole of the arc-shaped cutting edge 32 is used for cutting. In such a case, if the connective part of the bottom edge 2 and the peripheral edge 1 form an angle, it may lead to fractures. Thus, the bottom edge 2 and the peripheral edge 1 are preferably connected via an approximately arc-shaped R edge 8 or a chamfer end cutting edge 9. Further, the radius of curvature of the R edge 8 or the width obtained by measuring the chamfer end cutting edge 9 from a direction perpendicular to the tool axis O, is preferably 0.02 times or above to 0.2 times or below the tool radius. If it is smaller than 0.02 times the tool radius, the effect of fracture-prevention becomes small, and a tendency for fractures to occur is confirmed. If it is larger than 0.2 times the tool axis, the contact distance with the work material becomes long, which leads to an increase in cutting resistance, and a tendency for fractures and breakage to occur has been confirmed.

The present invention, wherein the arc-shaped cutting edge and the rim at the rearward side of the rotation at a flank of the arc-shaped cutting edge are of the aforementioned novel form, provides an end mill that enables high-efficiency machining of molds with complex forms, which further enables long tool life and stable machining, even in the machining of high-hardness materials.

Further, the end mill comprising the arc-shaped cutting edge and the rim at the rearward side of the rotation at a flank of the arc-shaped cutting edge of such form can be produced by applying a grinding stone from the edge ridgeline of the bottom edge toward the normal direction during tool production, while rotating the tool axis and moving from the tool center toward the periphery.

Figure 9:
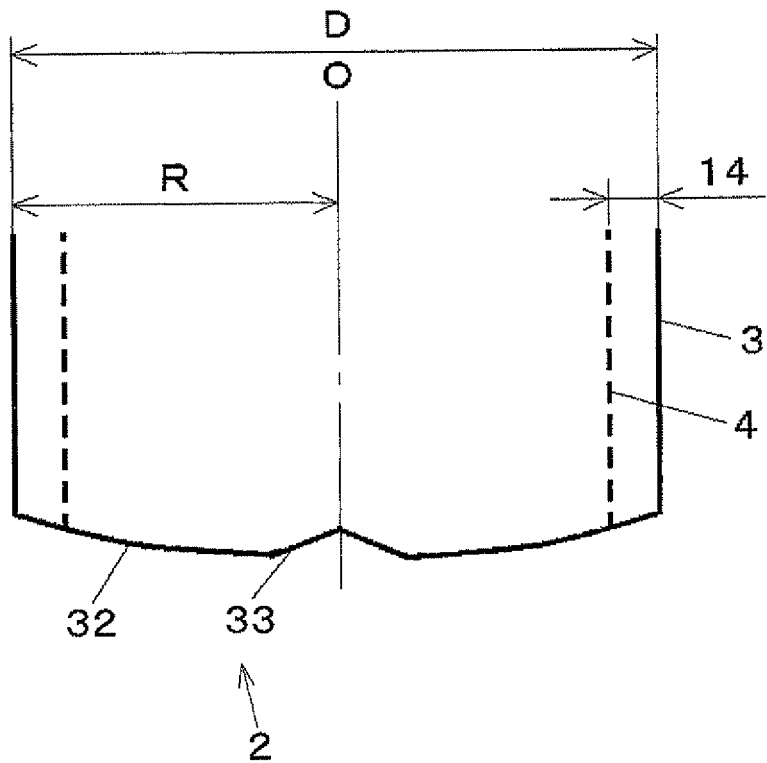
FIG. 9 shows the end mill of the present invention, which comprises a main peripheral edge that is provided at a position that is relatively on the outer peripheral side and a sub-peripheral edge that is provided at a position that is relatively on the inner circumference side.

Furthermore, in the present invention, even if the form of the bottom edge of the end mill, the arrangement of the bottom edge and the peripheral edge, and the form of the connective part of the bottom edge and the peripheral edge are change, the effect of the present invention can be attained. FIG. 9 shows the end mill of the present invention, which comprises a main peripheral edge that is provided at a position that is relatively on the outer peripheral side and a sub-peripheral edge that is provided at a position that is relatively on the inner circumference side. As shown in FIG. 9, the sub-peripheral edge 4 is provided at a position that is toward the inner circumference at an undersized amount of the peripheral edge 14 from the main peripheral edge 3. This enables the suppression of vibration and the reduction of cutting resistance. Further, by adopting the composition of the bottom edge composed of an arc-shaped cutting edge and a medium-to-low inclination cutting edge and the peripheral edge, so that they are composed of a main bottom edge and a main peripheral edge that are arranged at positions relatively on the outer peripheral side and a sub-bottom edge and a sub-peripheral edge that are arranged at positions relatively on the inner circumference side, suppression of vibration and reduction of cutting resistance, even during cutting at a position that is deep in the direction of the axis, in which the overhang amount of the tool is long. Hence, particularly in pocket machining, fractures that often occur at the side of the pocket formed at the bottom of a deep pocket and the corner of a pocket can be suppressed. Hereinafter, another example of the present invention will be described.

Figure 10:
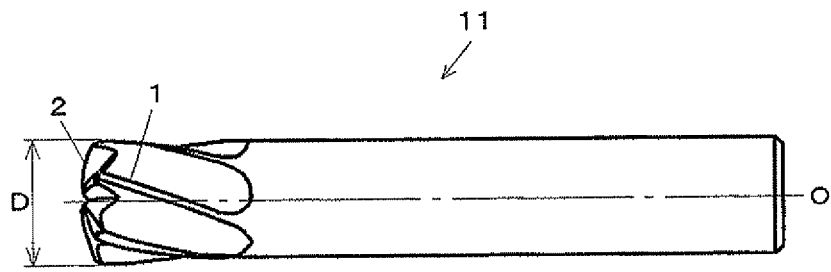
FIG. 10 is a front view of one example of the cemented carbide end mill of the present invention.

In another example of the present invention, the cemented carbide end mill of the present invention is described using FIG. 10 to FIG. 30. FIG. 10 is a front view of one example of the cemented carbide end mill of the present invention. As shown in FIG. 10, the end mill of the present invention 11 comprises a peripheral edge 1 and a bottom edge 2 that is provided at the end face on the tip side. The end mill of the present invention is used for contour machining, and cutting is performing mainly using the bottom edge 2.

Figure 11:
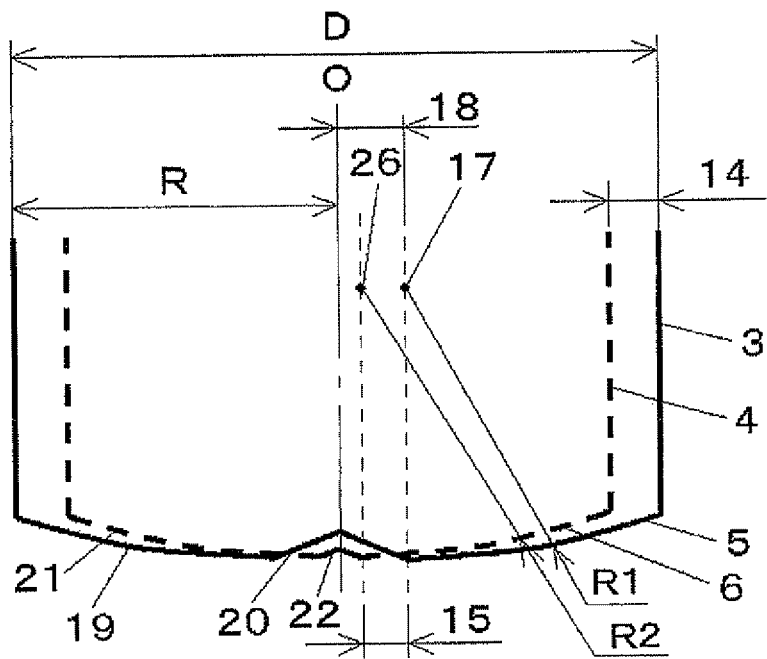
FIG. 11 is an enlarged view of the vicinity of the tip of the end mill of FIG. 10, showing the rotational trajectory of the peripheral edge, seen from a direction perpendicular to the tool axis of the end mill.

FIG. 11 is an enlarged view of the vicinity of the tip of the end mill of FIG. 10, showing the rotational trajectory of the peripheral edge, seen from a direction perpendicular to the tool axis of the end mill. In another example of the present invention, the cutting edge is composed mainly of a main peripheral edge 3, a main bottom edge 5 whose length from the tool axis O is relatively long, which is composed of an arc-shaped cutting edge of the main bottom edge 19 and a medium-to-low inclination cutting edge of the main bottom edge 20, as well as a sub-peripheral edge 4, and a sub-bottom edge 6 whose length from the tool axis O is relatively short, which is composed of an arc-shaped cutting edge of the sub-bottom edge 21 and a medium-to-low inclination cutting edge of the sub-bottom edge 22. Further, in another example of the present invention, the medium-to-low inclination cutting edge of the main bottom edge 20 and the medium-to-low inclination cutting edge of the sub-bottom edge 22 are of a shape stretching from the end of the arc-shaped cutting edge toward the tool axis O. Furthermore, in FIG. 11, the rotational trajectory of the main peripheral edge 3 that is provided at a position that is relatively on the outer peripheral side, the arc-shaped cutting edge of the main bottom edge 19, and the medium-to-low inclination cutting edge of the main bottom edge 20 are shown by a solid line, while the rotational trajectory of the sub-peripheral edge 4 that is provided at a position that is relatively on the inner circumference side, the arc-shaped cutting edge of the sub-bottom edge 21, and the medium-to-low inclination cutting edge of the sub-bottom edge 22 are shown by a dotted line.

As shown in FIG. 11, in another example of the present invention, the sub-peripheral edge 4, the arc-shaped cutting edge of the sub-bottom edge 21 and the medium-to-low inclination cutting edge of the sub-bottom edge 22 that constitute the sub-bottom edge 6, are each provided at a position that is toward the inner circumference side at an amount equal to the undersized amount of the peripheral edge 14 and the undersized amount of the bottom edge 15 from the main peripheral edge 3, the arc-shaped cutting edge of the main bottom edge 19, and the medium-to-low inclination cutting edge of the main bottom edge 20 composing the main bottom edge 5, respectively. In the present invention, the undersized amount of the peripheral edge 14 and the undersized amount of the bottom edge 15 are preferably in the range of 0.0025 times or above to 0.01 times or below the tool diameter D in a direction perpendicular to the tool axis O.

That is, in the present invention, the sub-bottom edge 6 and the sub-peripheral edge 4 are preferably formed at a position that is undersized in the range of 0.0025 times or above to 0.01 times or below the tool diameter D in a direction perpendicular to the tool axis O from the main bottom edge 5 and the main peripheral edge 3, respectively. In such a ease, the anti-vibration effect of the tool is maximized. Note that in the end mill of the present invention, the undersized amount of the bottom edge 15 refers to the distance between the main bottom edge 5 and the sub-bottom edge 6 when measured at a direction perpendicular to the tool axis. Hence, the undersized amount of the bottom edge 15 may vary depending on the position on the bottom edge at which it is measured. In the present invention, the maximum undersized amount, wherein the undersized amount of the bottom edge 15 is maximum, and the minimum undersized amount, wherein the undersized amount of the bottom edge 15 is minimum, are preferably both in the range of 0.0025 times or above to 0.01 times or below the tool diameter.

Figure 12:
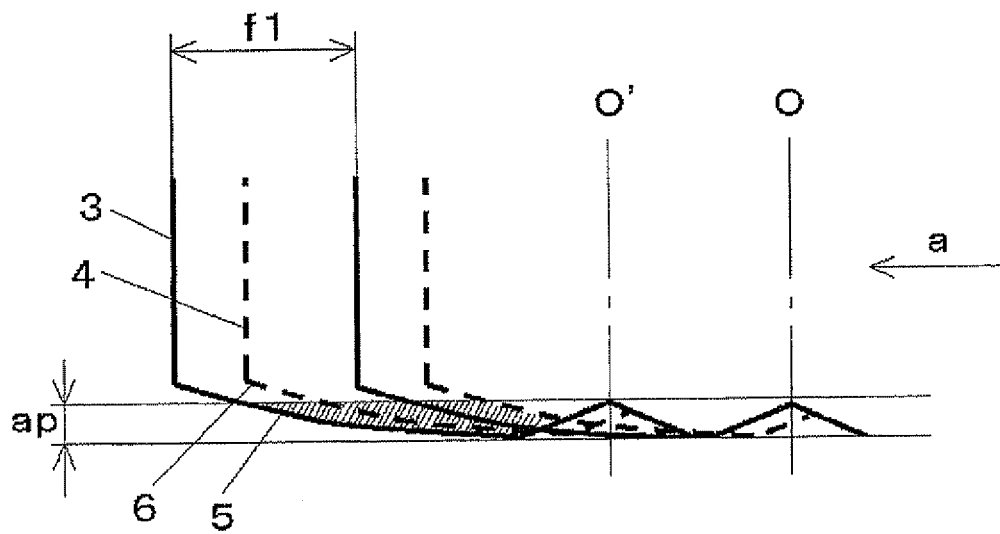
FIG. 12 is an enlarged view of the vicinity of the tip of the end mill, showing the cutting amount of the main bottom edge when cutting a part where the feed direction of the end mill is linear or approximately linear.
Figure 13:
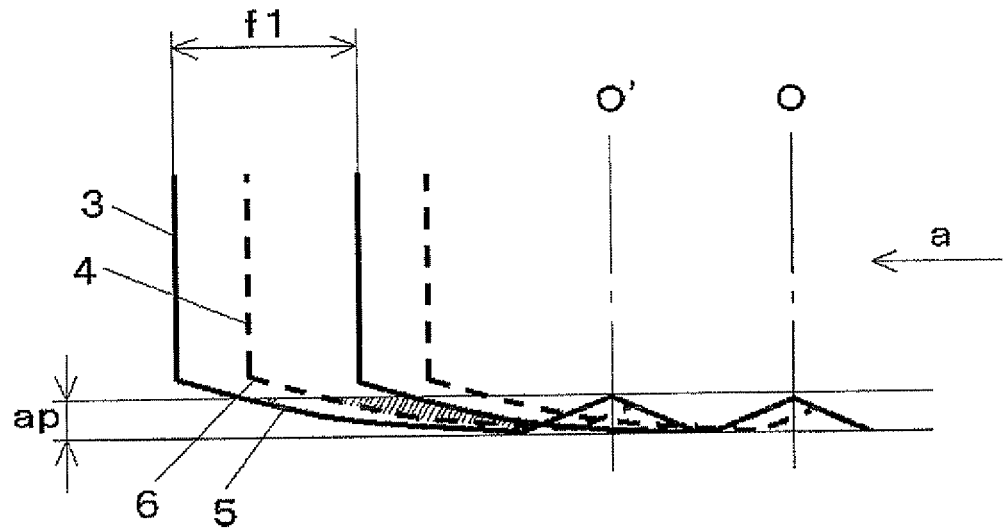
FIG. 13 is an enlarged view of the vicinity of the tip of the end mill, showing the cutting amount of the sub-bottom edge when cutting a part where the feed direction of the end mill is linear or approximately linear.

FIG. 12 is an enlarged view of the vicinity of the tip of the end mill, showing the cutting amount of the main bottom edge when cutting a part where the feed direction of the end mill is linear or approximately linear. FIG. 13 is an enlarged view of the vicinity of the tip of the end mill, showing the cutting amount of the sub-bottom edge when cutting a part where the feed direction of the end mill linear or approximately linear. In FIG. 12, the cutting amount of the main bottom edge 5, under the condition of axial-direction cutting depth ap and per-edge feed rate f1 for the cutting of a linear or approximately linear part, is shown by the diagonal lines. Similarly, in FIG. 13, the cutting amount of the sub-bottom edge 6, under the condition of axial-direction cutting depth ap and per-edge feed rate f1 for the cutting of a linear or approximately linear part, is shown by the diagonal lines. Note that in the figures that indicate the cutting amount, such as FIG. 12, the position and size of the axial-direction cutting depth ap, feed rate f1 for the cutting of a linear or approximately linear part, and the center of the arc that constitutes the arc-shaped cutting edge of the main bottom edge 17 are simplified and shown as a schematic diagram.

As shown in FIG. 12 and FIG. 13, in cutting by another example of the end mill of the present invention, if the tool axis of the end mill of the present invention exists at the position of the tool axis O of the end mill, when the end mill is moved for one unit feed rate during the machining of a linear or approximately linear part, the position of the tool axis of the end mill of the present invention moves to tool axis of the end mill when moved for one unit feed rate O'. As shown in FIG. 12 and FIG. 13, the cutting amount of the main bottom edge 5, when moved for the aforementioned one unit feed rate f1, becomes larger than that of the sub-bottom edge 6. Thus, in cutting a part where the feed direction of the end mill is linear or approximately linear, the cutting amounts of the main bottom edge 5 and the sub-bottom edge 6 differ, thereby being effective in the suppression of vibration caused by periodic waves such as resonance.

Figure 14:
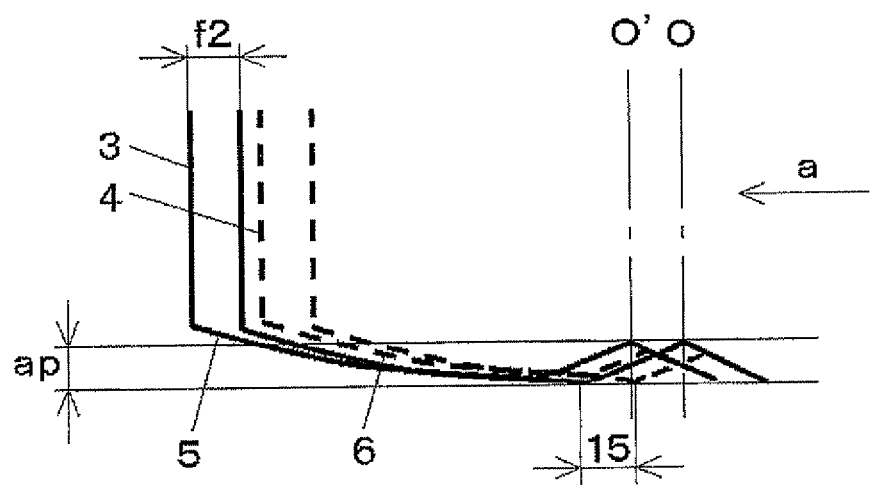
FIG. 14 is an enlarged view of the vicinity of the tip of the end mill, showing the difference between the cutting amount of the main bottom edge and the sub-bottom edge when cutting a corner of a mold.

FIG. 14 is an enlarged view of the vicinity of the tip of the end mill, showing the difference between the cutting amount of the main bottom edge and the sub-bottom edge, when cutting a corner of a mold. When cutting the corner of a mold, the end mill enters the corner of the mold by decelerating, due to the function of the machine tool and CAM. Hence, the per-edge feed rate becomes small. As shown in FIG. 14, the per-edge feed rate when machining a corner part f2 is smaller than the per-edge feed rate when machining a linear or approximately linear part f1 in FIG. 12 and FIG. 13, and smaller than the undersized amount of the bottom edge 15. In FIG. 14, the cutting amount of the main bottom edge 5, when the aforementioned per-edge feed rate f2 is smaller than the aforementioned per-edge feed rate f1 and smaller than the undersized amount of the bottom edge 15, is shown by the diagonal lines. When the per-edge feed rate f2 is smaller than the value of the undersized amount of the bottom edge 15, only the main bottom edge 5 comes in contact with the work material, and the sub-bottom edge 6 does not come in contact with the work material. Thus, the number of end mill edges in simultaneous contact with the work material, or the number of bottom edges that come in contact with the side of the corner of the mold, is reduced by the number of sub-bottom edges 6.

Therefore, in the present invention, by forming the sub-bottom edge 6 and the sub-peripheral edge 4 at a position that is undersized in the range of 0.0025 times or above to 0.01 times or below the tool diameter D, in a direction perpendicular to the tool axis O from the main bottom edge 5 and the main peripheral edge 3, the number of edges in simultaneous contact is reduced, thereby decreasing the cutting resistance from multiple directions. Thus, vibration that often arises during the cutting of corners, which is a necessity in the machining of molds, can effectively be suppressed. When the undersized amount of the bottom edge 15 is less than 0.0025 times the tool diameter D, the number of edges in simultaneous contact is not effectively reduced, and the anti-vibration effect becomes extremely small. When the undersized amount of the bottom edge 15 is more than 0.01 times the tool diameter D, the cutting amount of the main bottom edge 5 becomes extremely large, which can cause the main bottom edge 5 to fracture at an early stage, leading to a shortened tool life for the end mill.

Figure 15:
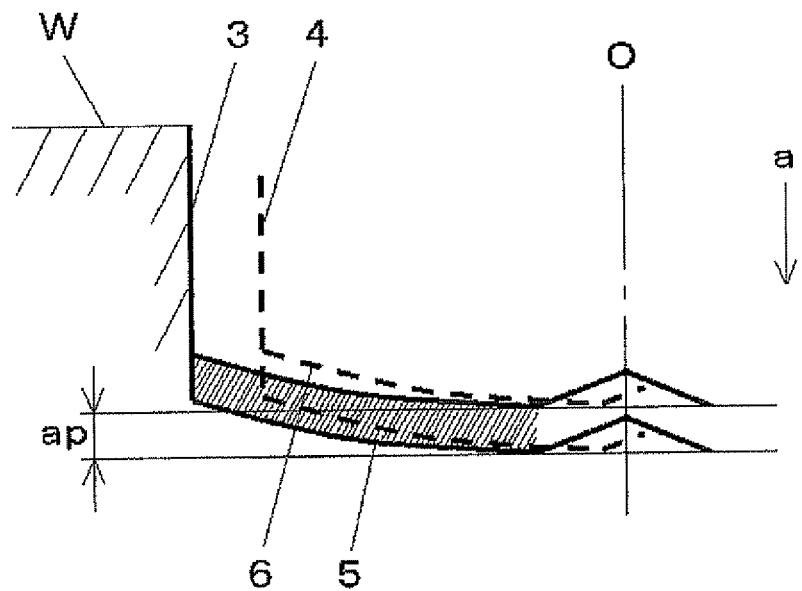
FIG. 15 is an enlarged view of the vicinity of the tip of the end mill, showing the cutting amount of the main bottom edge and when cutting the side of a mold.
Figure 16:
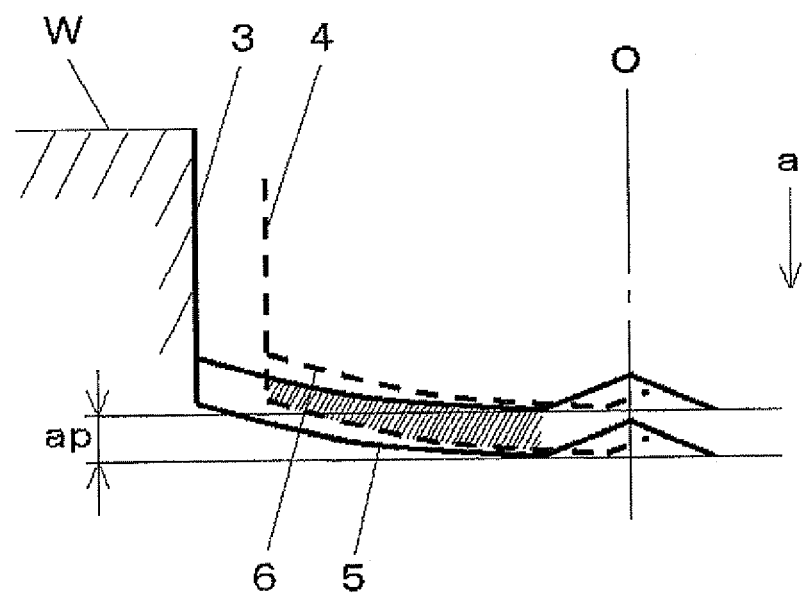
FIG. 16 is an enlarged view of the vicinity of the tip of the end mill, showing the cutting amount of the sub-bottom edge when cutting the side of a mold.

FIG. 15 is an enlarged view of the vicinity of the tip of the end mill, showing the cutting amount of the main bottom edge when cutting the side of a mold. FIG. 16 is an enlarged view of the vicinity of the tip of the end mill, showing the cutting amount of the sub-bottom edge when cutting the side of a mold. In FIG. 15, the tool moving direction a is the direction of the tool axis O, and the cutting amount of the main bottom edge 5, when machining under the condition of axial-direction cutting depth ap, is shown by the diagonal lines. Similarly, in FIG. 16, the tool moving direction a is the direction of the tool axis O, and the cutting amount of the sub-bottom edge 6, when machining under the condition of axial-direction cutting depth ap, is shown by the diagonal lines. As shown in FIG. 15 and FIG. 16, the tool moving direction a is the direction of the tool axis O, and the cutting amount of the main bottom edge 5 is larger than the cutting amount of the sub-bottom edge 6, when machining under the condition of axial-direction cutting depth ap. In cutting the side of a mold, when machining a part where the feed direction of the end mill is a part that is linear or approximately linear, as shown in FIG. 15 and FIG. 16, because the cutting amount of the main bottom 5 edge and the sub-bottom edge 6 differ, vibration by equal periodic wave such as resonance can effectively be suppressed.

Figure 17:
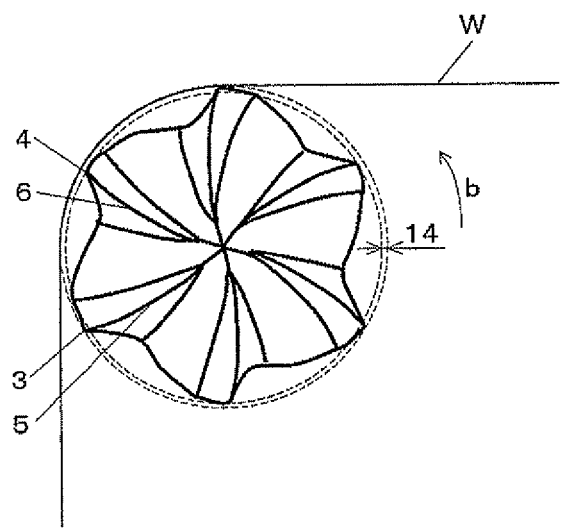
FIG. 17 is an enlarged view of the end mill seen from the bottom edge side, showing the difference between the contact of the main peripheral edge and the sub-peripheral edge with the work material, when machining a corner of a mold using another example of the end mill of the present invention, shown in FIG. 10.

FIG. 17 is an enlarged view of the end mill seen from the bottom edge side, showing the difference between the contact of the main peripheral edge and the sub-peripheral edge with the work material, when cutting a corner of a mold using another example of the end mill of the present invention, shown in FIG. 10. When cutting the corner of a mold, the end mill enters the corner by decelerating, due to the function of the machine tool and CAM, and thus, the per-edge feed rate becomes small. As shown in FIG. 17, when the per-edge feed rate is smaller than the undersized amount of the peripheral edge 14 during cutting of the mold corner, only the main peripheral edge 3 comes in contact with the work material W, and the sub-peripheral edge 4 does not come in contact with the work material. Thus, the number of edges in simultaneous contact, or the number of peripheral edges that come in contact with the side of the corner of the mold, is reduced. In the case shown in FIG. 17, if all of the peripheral edges of the end mill were positioned at the position of the main peripheral edge 3, the number of edges that come in contact with the work material W simultaneously is two. However, in the end mill of the present invention, since the sub-peripheral edges 4 are positioned toward the inner circumference at an undersized amount of the peripheral edge 14, the number of edges in simultaneous contact with the work material W becomes one. If the number of edges in simultaneous contact is reduced, the cutting resistance will not be applied from multiple directions, and vibration can be suppressed effectively. If the undersized amount of the peripheral edge 14 is less than 0.0025 times the tool diameter D, the number of edges in simultaneous contact cannot be reduced effectively, and the anti-vibration effect becomes extremely small. If the undersized amount of the peripheral edge 14 is larger than 0.01 times the tool diameter D, the cutting amount of the main peripheral edge 3 becomes extremely large, which can cause the main peripheral edge 3 to fracture at an early stage, leading to a shortened tool life for the end mill.

Further, as shown in FIG. 11, the main bottom edge 5 of the present invention is composed of a medium-to-low inclination cutting edge of the main bottom edge 20 and an arc-shaped cutting edge of the main bottom edge 19, which has an arc with a radius of curvature of the arc-shaped cutting edge of the main bottom edge R1, which is 1.5 times or above to 5 times or below the tool radius R. Similarly, the sub-bottom edge 6 of the present invention is composed of an arc-shaped cutting edge of the sub-bottom edge 21 with a radius of curvature of the arc-shaped cutting edge of the sub-bottom edge R2 and a medium-to-low inclination cutting edge of the sub-bottom edge 22. When the aforementioned radius of curvature R1 is in the range of 1.5 times or above to 5 times or below the tool radius R, the edge strength of the main bottom edge 5 can be attained. Further, the chip that develops during cutting can be thinned. Furthermore, since the undersized amount of the bottom edge 15 of the end mill of the present invention is in the range of 0.0025 times to 0.01 times the tool diameter, the radius of curvature R1 of the sub-bottom edge 6 does not become small, and the edge strength can be maintained, as in the case of the main bottom edge 5. Moreover, when the aforementioned radius of curvature R2 is in the range of 1.5 times or above to 5 times or below the tool radius R, the edge strength of the sub-bottom edge 6 can be attained, and is thus, preferable.

Figure 18:
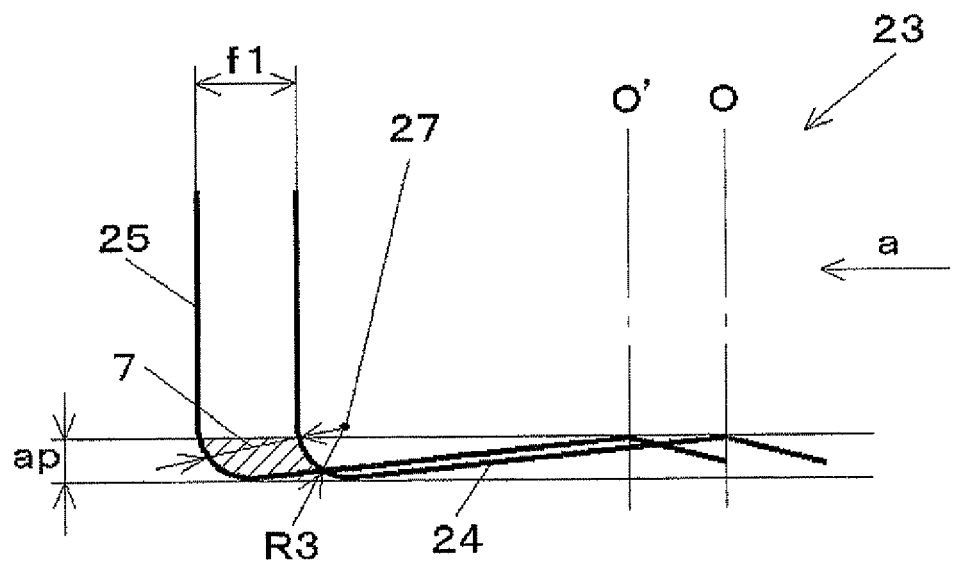
FIG. 18 is a schematic diagram of a chip that develops when cutting is performed using a conventional radius end mill.

FIG. 18 is a schematic diagram of a chip that develops when cutting is performed using a conventional radius end mill. In FIG. 18, the cutting amount of the bottom edge of a conventional radius end mill 24, when cutting a part that is linear or approximately linear under the condition of axial-direction cutting depth ap and per-edge feed rate f1, is shown by the diagonal lines. In a conventional radius end mill 23, the radius of curvature of the arc-shaped cutting edge of the bottom edge R3 is about 0.1 times to 0.5 times the tool radius R. Thus, when the length of the area indicated by the diagonal lines is measured in the direction of a straight line formed from the center of the arc constituting the arc-shaped cutting edge of the bottom edge 27 or the center of the arc constituting the arc-shaped cutting edge of the main bottom edge 17 in a conventional radius end mill, to the intersection obtained by a straight line, which is drawn at a height of cutting depth ap in the axial direction from the intersection of the medium-to-low inclination cutting edge and the arc-shaped cutting edge, and the arc-shaped cutting edge, the actual thickness of the chip 7 becomes thick. Hence, the cutting impact becomes large, and fractures tend to occur. Further, because the actual thickness of the chip 7 becomes thick, cutting heat increases, and the progress of abrasion quickens.

Figure 19:
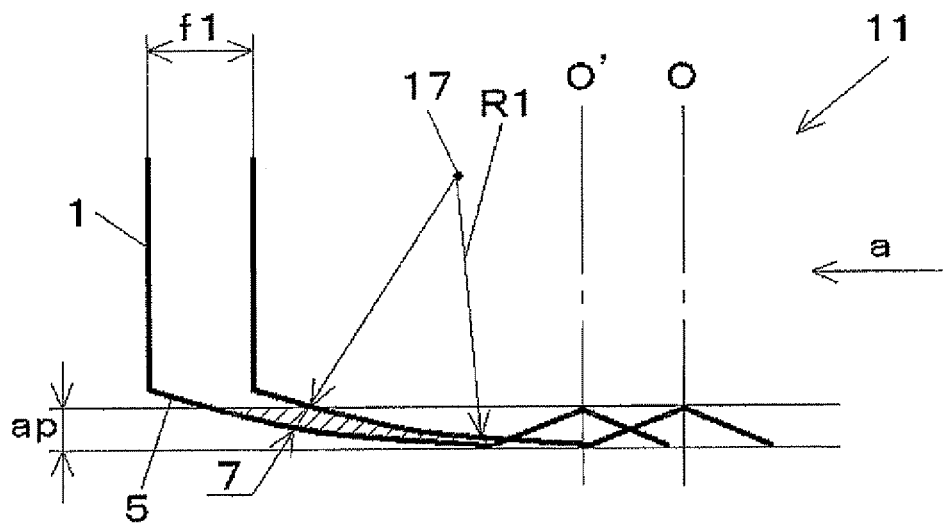
FIG. 19 is a schematic diagram of a chip that develops when cutting is performed using the end mill of the present invention.

FIG. 19 is a schematic diagram of the chip that develops when cutting is performed using the end mill of the present invention. In FIG. 19, the cutting amount of the main bottom edge 5, when cutting a part that is linear or approximately linear under the condition of axial-direction cutting depth ap and per-edge feed rate f1, is shown by the diagonal lines. The main bottom edge 5 of the end mill of the present invention comprises a medium-to-low inclination cutting edge of the main bottom edge and an arc-shaped cutting edge of the main bottom edge, wherein the radius of curvature of the arc-shaped cutting edge of the main bottom edge R1 is 1.5 times or above to 5 times or below the tool radius R. Thus, because the actual thickness of the chip 7 formed during cutting becomes thin, the cutting impact becomes small, and the fracture resistance of the end mill is enhanced. Furthermore, the actual thickness of the chip 7 formed during cutting becomes thin, which enables to suppress cutting heat, thereby enhancing abrasion resistance. Due to such effects, the feed rate can be increased, allowing the enhancement of efficiency. Therefore, by using the end mill of the present invention, stable machining with long tool life can be obtained for the high-efficiency cutting of high-hardness materials.

Figure 20:
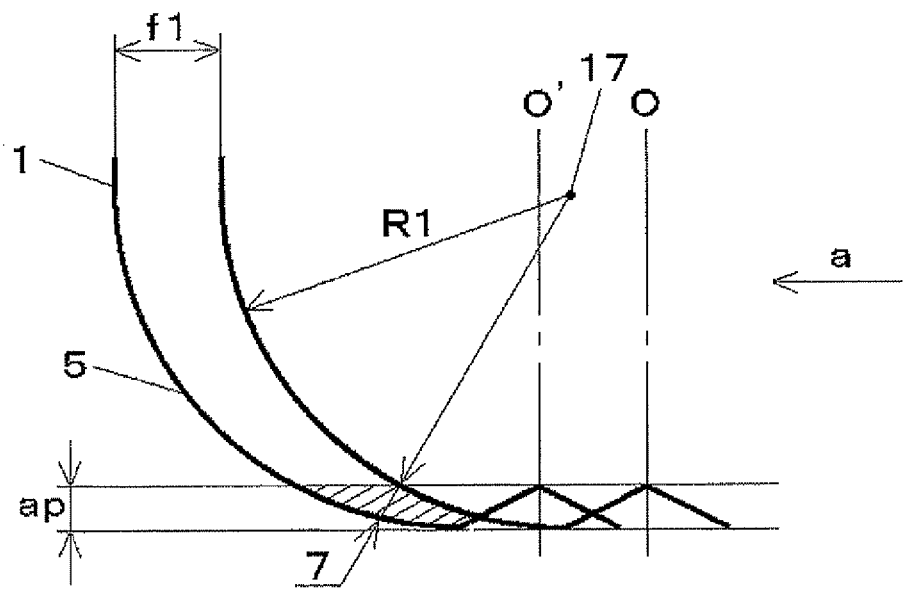
FIG. 20 is a schematic diagram of a chip that develops when cutting is performed using an end mill with a main bottom edge, wherein the radius of curvature of the arc-shaped cutting edge of the main bottom edge is less than 1.5 times the tool radius.

FIG. 20 is a schematic diagram of the chip that develops when cutting is performed using an end mill with a main bottom edge, wherein the radius of curvature of the arc-shaped cutting edge of the main bottom edge is less than 1.5 times the tool radius. In FIG. 20, the cutting amount of the main bottom edge 5, when cutting a part that is linear or approximately linear under the condition of axial-direction cutting depth ap and per-edge feed rate f1, is shown by the diagonal lines. When the radius of curvature of the arc-shaped cutting edge of the main bottom edge R1 is less than 1.5 times the tool radius R, it becomes closer to the form of a ball end mill, and thus, the actual thickness of the chip 7 formed during cutting becomes thick, causing cutting resistance to become large. Further, the strength of the bottom edge 5 becomes insufficient and fractures are likely to occur.

Figure 21:
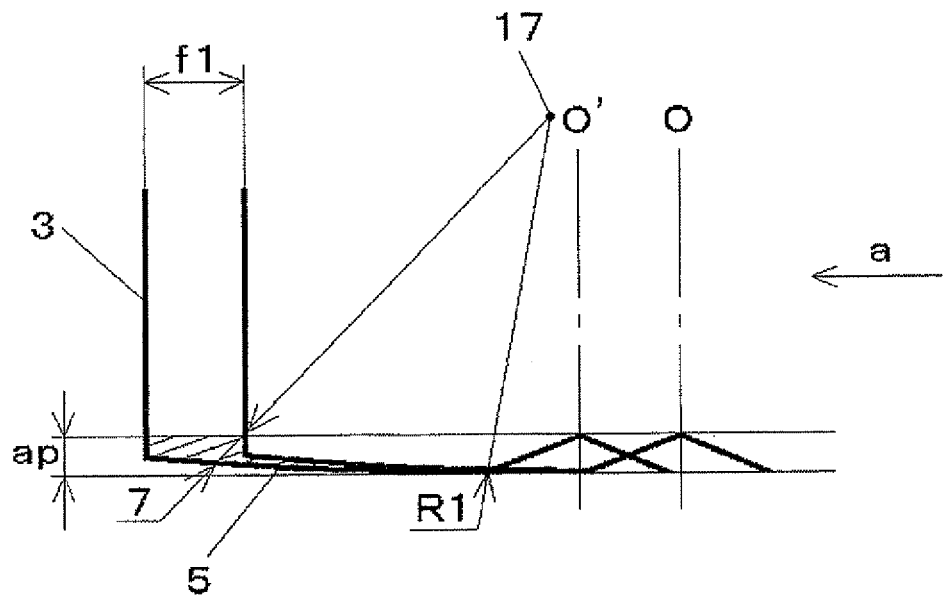
FIG. 21 is a schematic diagram of a chip that develops when cutting is performed using an end mill with a main bottom edge, wherein the radius of curvature of the arc-shaped cutting edge of the main bottom edge is more than 5 times the tool radius.

Further, FIG. 21 is a schematic diagram of the chip that develops when cutting is performed using an end mill with a main bottom edge, wherein the radius of curvature of the arc-shaped cutting edge of the main bottom edge is more than 5 times the tool radius. In FIG. 21, the cutting amount of the main bottom edge 5, when cutting a part that is linear or approximately linear, under the condition of axial-direction cutting depth ap and per-edge feed rate f1, is shown by the diagonal lines. When the radius of curvature of the arc-shaped cutting edge of the bottom edge R1 is more than 5 times the tool radius R, machining is constantly performed using both the main peripheral edge 3 and the sub-peripheral edge 4, if the aforementioned cutting depth ap is set at a large value. Thus, the actual thickness of the chip 7 formed during cutting becomes thick. Further, the impact during cutting becomes large, and fractures are more likely to occur. In addition, cutting heat increases, causing abrasion to proceed more quickly.

As shown in FIG. 11, in the present invention, the center distance of the arc 18, which is the distance between the center of the arc 17 that constitutes the arc-shaped cutting edge of the main bottom edge 19 and the tool axis O, measured in a direction perpendicular to the tool axis, is preferably in the range of 0.05 times or above to 0.25 times or below the tool diameter D. When the aforementioned center distance 18 is 0.05 times or above the tool diameter D, cutting with the edge in the central part and its vicinity, where the cutting rate becomes zero, can be avoided. Further, when the aforementioned center distance 18 is 0.25 times or below the tool diameter D, only the bottom edge 2 is used for cutting, even when the cutting depth in the axial direction is set large. Thus, the actual thickness of the chip 7 formed during cutting becomes thin, and high-efficiency stable machining is made possible.

Figure 22:
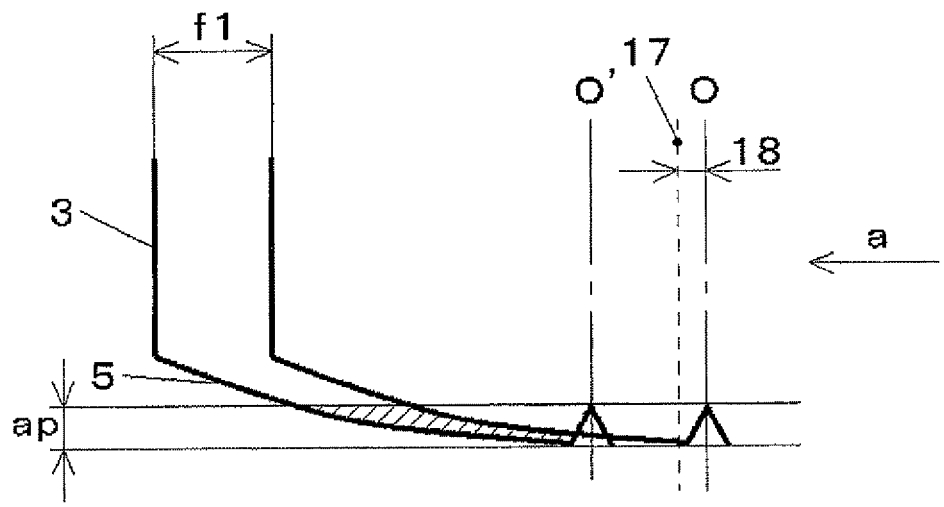
FIG. 22 is a schematic diagram of a chip that develops when cutting is performed using an end mill, wherein the center distance of the arc is less than 0.05 times the tool diameter D.

FIG. 22 is a schematic diagram of the chip that develops when cutting is performed using an end mill, wherein the center distance of the arc is less than 0.05 times the tool diameter D. In FIG. 22, the cutting amount of the main bottom edge 5, when cutting a part that is linear or approximately linear, under the condition of axial-direction cutting depth ap and per-edge feed rate f1, is shown by the diagonal lines. When the center distance of the arc 18, which is the distance between the center of the arc that constitutes the arc-shaped cutting edge of the main bottom edge 17 and the tool axis O, measured in a direction perpendicular to the tool axis, is smaller than 0.05 times the tool diameter D, as shown in FIG. 22, cutting is performed at the central part of the end mill and its vicinity, where the cutting rate is low. Therefore, cutting performance deteriorates and abrasion is likely to progress.

Figure 23:
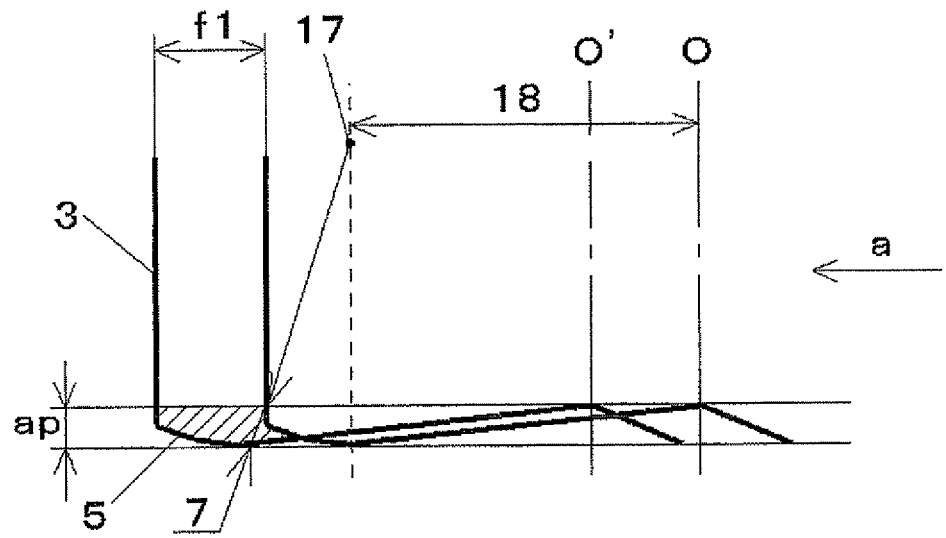
FIG. 23 is a schematic diagram of a chip that develops when cutting is performed using an end mill, wherein the center distance of the arc is more than 0.25 times the tool diameter D.

FIG. 23 is a schematic diagram of the chip that develops when cutting is performed using an end mill, wherein the center distance of the arc is more than 0.25 times the tool diameter D. In FIG. 23, the cutting amount of the main bottom edge 5, when cutting a part that is linear or approximately linear under the condition of axial-direction cutting depth ap and per-edge feed rate f1, is shown by the diagonal lines. When the center distance of the arc 18, which is the distance between the center of the arc that constitutes the arc-shaped cutting edge of the main bottom edge 17 and the tool axis O, measured in a direction perpendicular to the tool axis, exceeds 0.25 times the tool diameter D, as shown in FIG. 23, the actual thickness of the chip 7 formed during cutting becomes thick. Thus, a large cutting depth cannot be set, and high-efficiency cutting becomes difficult.

Figure 28:
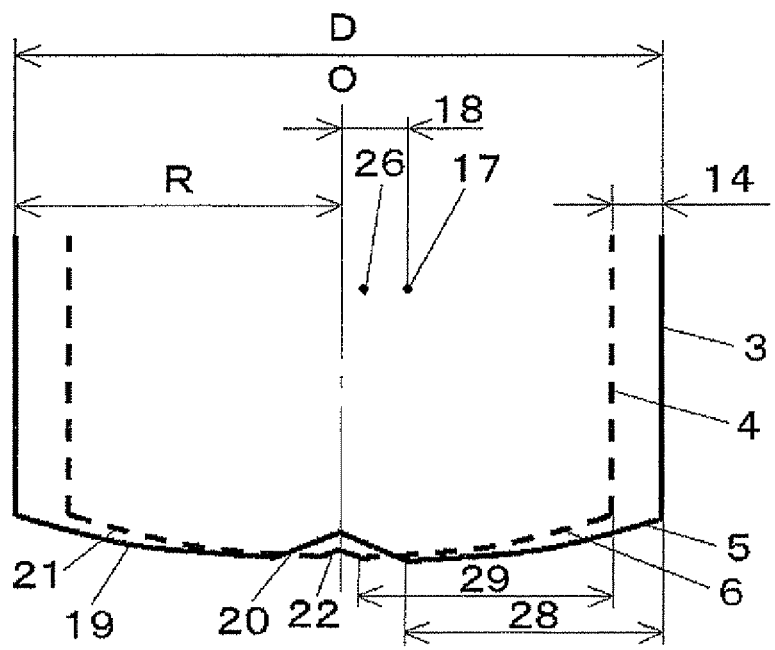
FIG. 28 is an enlarged view of the rotational trajectory of another end mill of the present invention, showing the length of the arc-shaped cutting edge measured at a direction perpendicular to the tool axis.

FIG. 28 is an enlarged view of the rotational trajectory of another embodiment of the end mill of the present invention, showing the length of the arc-shaped cutting edge measured at a direction perpendicular to the tool axis. The end mill shown in FIG. 28 is an example wherein the length of the arc-shaped cutting edge of the main bottom edge 28 is 80% of the tool radius R, and the length of the arc-shaped cutting edge of the sub-bottom edge 29 is also 80% of the tool radius R. As shown in FIG. 28, in the present invention, the ratio of the length of the arc-shaped cutting edge and the medium-to-low inclination cutting edge, in a direction perpendicular to the tool axis O, is preferably at least 50% or more and less than 90% of the tool radius R for the length of the arc-shaped cutting edge of the main bottom edge. If at least the length of the arc-shaped cutting edge of the main bottom edge is 50% or more and less than 90% of the tool radius R, the position of the connective part of the arc-shaped cutting edge 19 and the medium-to-low inclination cutting edge 20 comes in the same range, in terms of the distance from the tool axis O in a direction perpendicular to the tool axis, as the center of the arc-shaped cutting edge 17. Thus, if the length of the arc-shaped cutting edge of the main bottom edge is less than 50%, the same phenomenon as that shown in FIG. 23 occurs, and the actual thickness of the chip 7 becomes thick. Thus, it may become impossible to set a large cutting depth. Further, if the length of the arc-shaped cutting edge of the main bottom edge is 90% or more, the same phenomenon as that shown in FIG. 22 may occur, causing cutting to be performed using the edge in the central part of the end mill and its vicinity, where cutting rate is low. Thus, cutting performance deteriorates, and abrasion may proceed more quickly.

Figure 29:
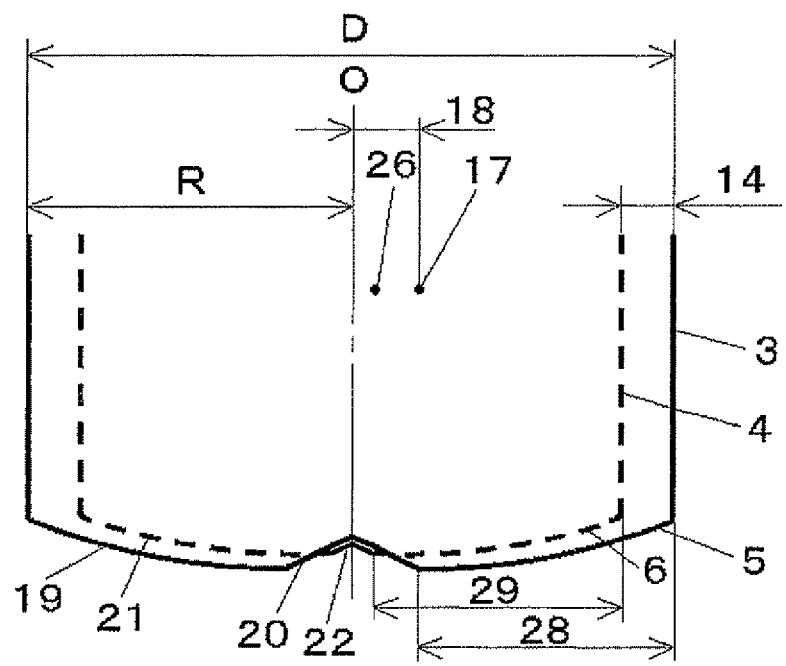
FIG. 29 is an enlarged view of the rotational trajectory of another end mill of the present invention, showing the length of the arc-shaped cutting edge measured at a direction perpendicular to the tool axis.

FIG. 29 is an enlarged view of the rotational trajectory of another embodiment of the end mill of the present invention, showing the length of the arc-shaped cutting edge measured at a direction perpendicular to the tool axis. The end mill shown in FIG. 29 is an example wherein the length of the arc-shaped cutting edge of the main bottom edge 28 is 80% of the tool radius R, and the length of the arc-shaped cutting edge of the sub-bottom edge 29 is 77% of the tool radius R. In the present invention, the length of the arc-shaped cutting edge of the main bottom edge 28 and the length of the arc-shaped cutting edge of the sub-bottom edge 29 do not necessarily have to be equal, and the effects of the present invention can be attained, even with the length of the arc-shaped cutting edge of the sub-bottom edge 29 being about 20% shorter than the length of the arc-shaped cutting edge of the main bottom edge 28. That is, the effect of the present invention can be attained if the length of the arc-shaped cutting edge of the sub-bottom edge 29 is 80% or above and 100% or below the length of the arc-shaped cutting edge of the main bottom edge 28. Note that the preferable length of the arc-shaped cutting edge of the sub-bottom edge 29 is 90% or above and 100% or below the length of the arc-shaped cutting edge of the main bottom edge 28.

Figure 30:
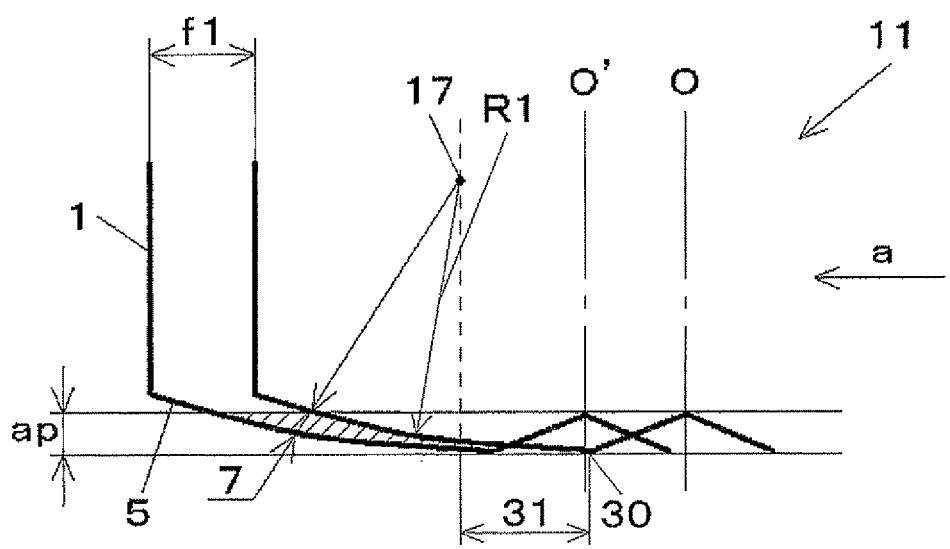
FIG. 30 shows another example of the end mill of the present invention.

FIG. 30 shows yet another example of the end mill of the present invention. In the present invention, the distance between the center of arc and the connective part 31, which is the distance between the center of the arc that constitutes the arc-shaped cutting edge of the main bottom edge 17 and the connective part of the arc-shaped cutting edge and the medium-to-low inclination cutting edge 30, measured in a direction perpendicular to the tool axis O, is preferably 0% or above to 20% or below the tool radius. This allows the thickness of the chip 7 to be extremely thin, and thus, cutting resistance can be suppressed, enabling stable machining with a very long tool life. Here, it is preferable that the connective part of the arc-shaped cutting edge and the medium-to-low inclination cutting edge 30 is positioned at a relatively inner position than the center of the arc that constitutes the arc-shaped cutting edge of the main bottom edge 17, since the machinability is enhanced. Further, even though the effect of the present invention is most obtained when the distance between the center of the arc and the connective part 31 is 0% of the tool radius, that is, when the center of the arc that constitutes the arc-shaped cutting edge of the main bottom edge 17 and the connective part of the arc-shaped cutting edge and the medium-to-low inclination cutting edge 30 exist on a straight line that is parallel to the tool axis O, about the same effects can be obtained when the distance between the center of the arc and the connective part 31 is set to 0% or above to 10% or below the tool radius.

Figure 24:
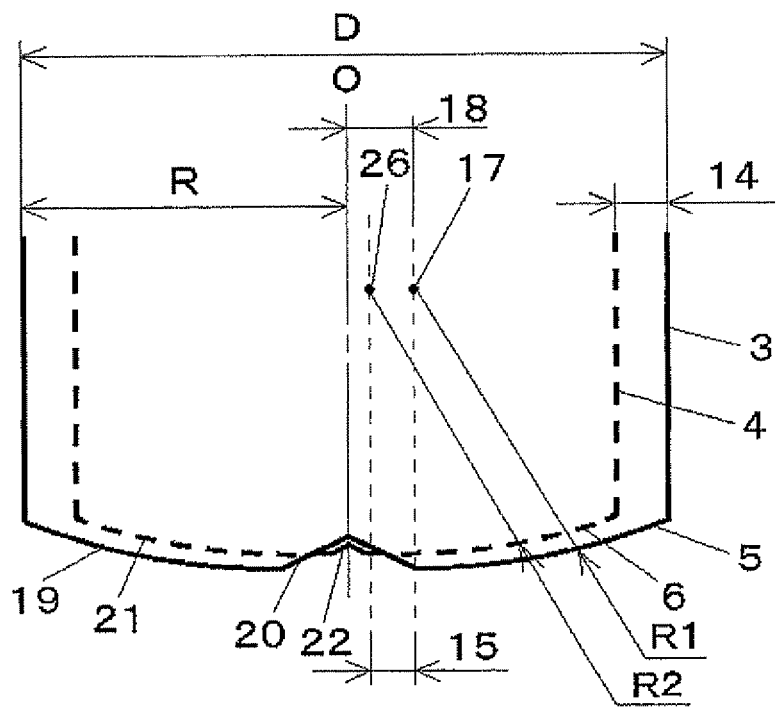
FIG. 24 shows the end mill of the present invention, wherein the radius of curvature of the arc-shaped cutting edge of the main bottom edge and the radius of curvature of the arc-shaped cutting edge of the sub-bottom edge are the same.

In the present invention, the radius of curvature of the arc-shaped cutting edge of the main bottom edge R1 is preferably the same as the radius of curvature of the arc-shaped cutting edge of the sub-bottom edge R2. FIG. 24 shows the end mill of the present invention, wherein the radius of curvature of the arc-shaped cutting edge of the main bottom edge and the radius of curvature of the arc-shaped cutting edge of the sub-bottom edge are same. As shown in FIG. 24, when the radius of curvature of the arc-shaped cutting edge of the main bottom edge R1 is the same as the radius of curvature of the arc-shaped cutting edge of the sub-bottom edge R2, the undersized amount of the bottom edge 15 becomes uniform throughout the entire bottom edge 2, and therefore, the load on the bottom edge 2 during cutting becomes uniform, enabling stable machining. In this case, when the values of the aforementioned radius of curvature R1 and the aforementioned radius of curvature R2 are compared, in the present invention, even if a difference of 0.001 times or above to 0.2 times or below the tool radius R occurs, the aforementioned radius of curvature R1 and the aforementioned radius of curvature R2 can be deemed equal, and the same effect as that obtained when the aforementioned radius of curvature R1 and the aforementioned radius of curvature R2 are equal can be obtained. Further, since the production of an end mill with a main bottom edge and a sub-bottom edge of the same radii of curvatures is easier than manufacturing an end mill with a main bottom edge and a sub-bottom edge of different radii of curvatures, tool precision can be secured and reduction of production cost can be realized.

Figure 25:
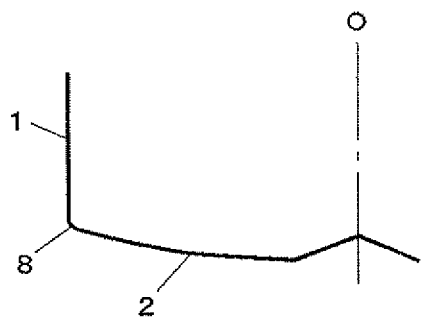
FIG. 25 is an enlarged view of the vicinity of the R edge of the end mill of the present invention, wherein the bottom edge and the peripheral edge are connected via an approximately arc-shaped R edge.

FIG. 25 is an enlarged view of the vicinity of the R edge in the end mill of the present invention, wherein the bottom edge and the peripheral edge are connected via an approximately arc-shaped R edge. The peripheral edge 1 and the bottom edge 2 of the end mill of the present invention may be connected via an approximately arc-shaped R edge 8. By using the end mill of the present invention provided with an approximately arc-shaped R edge 8, long-life machining is made possible without fractures, even when the connective part of the peripheral edge 1 and the bottom edge 2 come in contact with the work material during the cutting of a mold with an inclined side with a nearly-perpendicular angle.

Figure 26:
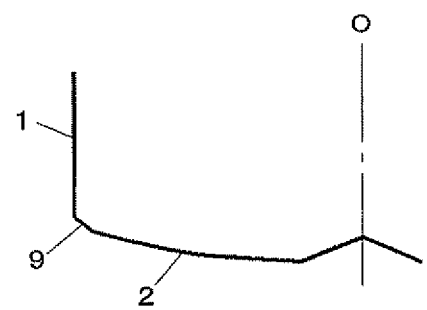
FIG. 26 is an enlarged view of the vicinity of the chamfer end cutting edge of the end mill of the present invention, wherein the bottom edge and the peripheral edge are connected via a chamfer end cutting edge.

FIG. 26 is an enlarged view of the vicinity of the chamfer end cutting edge in the end mill of the present invention, wherein the bottom edge and the peripheral edge are connected via a chamfer end cutting edge. The peripheral edge 1 and the bottom edge 2 of the end mill of the present invention may be connected via a chamfer end cutting edge 9. By using an end mill of the present invention provided with a chamfer end cutting edge 9, as with the one with the approximately arc-shaped R edge, long-life machining is made possible without fractures, even when the connective part of the peripheral edge 1 and the bottom edge 2 come in contact with the work material during the cutting of a mold with an inclined side with a nearly-perpendicular angle.

Figure 27:
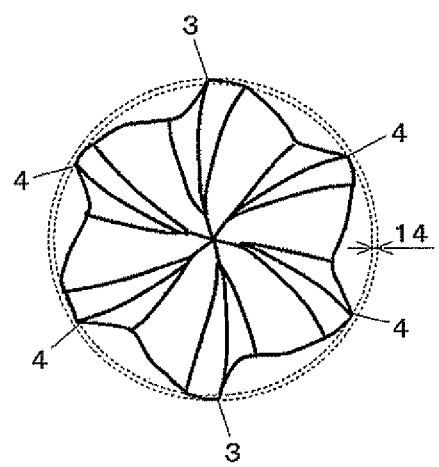
FIG. 27 is a left-side view of the end mill of the present invention, comprising two main peripheral edges and four sub-peripheral edges.

FIG. 27 is a left-side view of the end mill of the present invention, which comprises two main peripheral edges and four sub-peripheral edges. In FIG. 17, the number of main peripheral edges 3 is three, the number of sub-peripheral edges 4 is also three, and the main peripheral edge 3 and the sub-peripheral edge 4 are arranged alternately. However, the numbers of the main peripheral edge 3 and the sub-peripheral edge 4 do not necessarily have to be equal to obtain the effect of the present invention, as long as there are at least one set each of the main peripheral edge 3 and the sub-peripheral edge 4. In terms of the arrangement of the main peripheral edge 3 and the sub-peripheral edge 4, they do not have to be arranged alternately, but may be arranged as main peripheral edge 3, sub-peripheral edge 4, sub-peripheral edge 4, main peripheral edge 3, sub-peripheral edge 4, sub-peripheral edge 4 etc., as shown in FIG. 27. The effect of chattering suppression can be obtained in such an arrangement, as well. Further, even in an end mill that comprises a different number of peripheral edges than the ones disclosed in the present specification, by appropriately controlling the number and arrangement of the main peripheral edge 3 and the sub-peripheral edge 4, the effect of the present invention can be attained.

Hereinafter, the present invention will be described in further detail with reference to the following Examples. However, the present invention is not limited to these Examples.

EXAMPLE

Example 1

To verify the advantages of the end mill of the present invention, a cutting test was performed by machining a pocket shape. For the cutting test, examples of the present invention and comparative examples were used. The specifications of each tool were as follows.

In Example 1, Present Invention Example 1 and Conventional Examples 2 and 3 were used. As common dimensions of the end mill form, the tool diameter D was 10 mm, the core diameter was 7.5 mm, the angle of torsion of the peripheral edge was 20 degrees, the number of cutting edges was 6, the coating was TiSiN-type and the base material was cemented carbide.

In Present Invention Example 1 and Conventional Examples 2 and 3, the radius of curvature of the rim at the rearward side of the rotation at the flank of the arc-shaped cutting edge was set at 13 mm, and end mills of varying radius of curvatures of the arc-shaped cutting edge were prepared.

For Present Invention Example 1, an end mill with the bottom edge and the peripheral edge connected was prepared. The radius of curvature of the arc-shaped cutting edge was set at 1.3 times that of the tool radius, or 6.5 mm, and the radius of curvature of the rim at the rearward side of the rotation at the flank of the arc-shaped cutting edge was set at 2.6 times that of the tool radius, or 13 mm. The radius of curvature of the arc-shaped cutting edge was made to be smaller than the radius of curvature of the rim at the rearward side of the rotation at the flank of the arc-shaped cutting edge.

For Conventional Example 2, one with the radius of curvature of the arc-shaped cutting edge set at 13 mm, and the radius of curvature of the rim at the rearward side of the rotation at the flank of the arc-shaped cutting edge set at 13 mm was prepared. The radius of curvature of the arc-shaped cutting edge and the radius of curvature of the rim at the rearward side of the rotation at the flank of the arc-shaped cutting edge were of equal values.

For Conventional Example 3, one with the radius of curvature of the arc-shaped cutting edge set at 20 mm, and the radius of curvature of the rim at the rearward side of the rotation at the flank of the arc-shaped cutting edge set at 13 mm was prepared. The radius of curvature of the arc-shaped cutting edge was set to be larger than the radius of curvature of the rim at the rearward side of the rotation at the flank of the arc-shaped cutting edge.

As a method of evaluation, roughing of a pocket shape was performed by contour machining, and the state of damage of the tools were compared. The conditions of the cutting test were of unified condition for each sample number. The work material was a block of hardened material of SKD11 (62HRC), and the dimensions of the work material was 60 mm in height, 120 mm in length, and 70 mm in width. The rotational frequency of the end mill was 2200 rpm (cutting rate: 70 m/min), the feed rate was 3300 mm/min (per-edge feed rate: 0.25 mm/edge), axial direction cutting depth was 0.2 mm, radial direction cutting depth was 5 mm, and air blow was used. The machining shape was of a pocket shape that includes a corner shape where vibration tends to occur. The dimension of the pocket was 40 mm in depth, 100 mm in length, and 50 mm in width, and the inclination angle of the side was 1°. To evaluate the machining life of the samples prepared, two pockets were cut under the same conditions, and the abrasion width was measured using an optical microscope by observing the presence or lack of fractures in the bottom edge by sight.

As a standard of evaluation for the cutting test, those with an abrasion width of less than 0.08 mm at the flank of the bottom edge, without any fractures, were evaluated as Good. The test results are shown in Table 1.

TABLE 1

| Sample Number | | Radius of Curvature of Arc-shaped Cutting Edge Ra (mm) | Radius of Curvature of Rim at Rearward Side of Rotation Rb (mm) | Ratio of Ra and Rb | Abrasion Width (mm) | Fracture |
|---|---|---|---|---|---|---|
| Present Invention Example | 1 | 6.5 | 13 | 0.5 | 0.047 | None |
| Conventional Example | 2 | 13 | 13 | 1.0 | — | Yes |
| Conventional Example | 3 | 20 | 13 | 1.54 | — | Yes |

As a result, in Present Invention Example 1, since the radius of curvature of the arc-shaped cutting edge Ra was made to be smaller than the radius of curvature of the rim at the rearward side of the rotation Rb, the abrasion width at the flank of the bottom edge was 0.047 mm, and a good result without any fractures was obtained.

In contrast, in Conventional Examples 2 and 3, since the radius of curvature of the arc-shaped cutting edge Ra was made to be the same or larger than the radius of curvature of the rim at the rearward side of the rotation Rb, the impact during cutting was large, and fractures occurred.

Example 2

In Example 2, in order to confirm the relationship between the radius of curvature of the arc-shaped cutting edge and the radius of curvature of the rim at the rearward side of the rotation at the flank of the arc-shaped cutting edge, a cutting test was performed by cutting a pocket shape, as in Example 1.

In Example 2, Present Invention Examples 4 to 10 were used. As common dimensions of the end mill form, as with Present Invention Example 1 used in Example 1, the tool diameter D was 10 mm, the core diameter was 7.5 mm, the angle of torsion of the peripheral edge was 20 degrees, the number of cutting edges was 6, the radius of curvature of the rim at the rearward side of the rotation at the flank of the arc-shaped cutting edge was set at 2.6 times that of the tool radius, or 13 mm, the coating was TiSiN-type and the base material was cemented carbide, and an end mill wherein the bottom edge and the peripheral edge were connected was prepared.

For Present Invention Example 4, the radius of curvature of the arc-shaped cutting edge was set at 0.52 times that of the tool radius, or 2.6 mm, and the radius of curvature of the rim at the rearward side of the rotation at the flank of the arc-shaped cutting edge was set at 13 mm. The radius of curvature of the arc-shaped cutting edge was made to be 0.2 times the radius of curvature of the rim at the rearward side of the rotation at the flank of the arc-shaped cutting edge.

For Present Invention Example 5, the radius of curvature of the arc-shaped cutting edge was set at 0.78 times that of the tool radius, or 3.9 mm, and the radius of curvature of the rim at the rearward side of the rotation at the flank of the arc-shaped cutting edge was set at 13 mm. The radius of curvature of the arc-shaped cutting edge was made to be 0.3 times the radius of curvature of the rim at the rearward side of the rotation at the flank of the arc-shaped cutting edge.

For Present Invention Example 6, the radius of curvature of the arc-shaped cutting edge was set at 1.04 times that of the tool radius, or 5.2 mm, and the radius of curvature of the rim at the rearward side of the rotation at the flank of the arc-shaped cutting edge was set at 13 mm. The radius of curvature of the arc-shaped cutting edge was made to be 0.4 times the radius of curvature of the rim at the rearward side of the rotation at the flank of the arc-shaped cutting edge.

For Present Invention Example 7, the radius of curvature of the arc-shaped cutting edge was set at 1.3 times that of the tool radius, or 6.5 mm, and the radius of curvature of the rim at the rearward side of the rotation at the flank of the arc-shaped cutting edge was set at 13 mm. The radius of curvature of the arc-shaped cutting edge was made to be 0.5 times the radius of curvature of the rim at the rearward side of the rotation at the flank of the arc-shaped cutting edge, as Present Invention Example 1.

For Present Invention Example 8, the radius of curvature of the arc-shaped cutting edge was set at 1.56 times that of the tool radius, or 7.8 mm, and the radius of curvature of the rim at the rearward side of the rotation at the flank of the arc-shaped cutting edge was set at 13 mm. The radius of curvature of the arc-shaped cutting edge was made to be 0.6 times the radius of curvature of the rim at the rearward side of the rotation at the flank of the arc-shaped cutting edge.

For Present Invention Example 9, the radius of curvature of the arc-shaped cutting edge was set at 1.82 times that of the tool radius, or 9.1 mm, and the radius of curvature of the rim at the rearward side of the rotation at the flank of the arc-shaped cutting edge was set at 13 mm. The radius of curvature of the arc-shaped cutting edge was made to be 0.7 times the radius of curvature of the rim at the rearward side of the rotation at the flank of the arc-shaped cutting edge.

For Present Invention Example 10, the radius of curvature of the arc-shaped cutting edge was set at 2.08 times that of the tool radius, or 10.4 mm, and the radius of curvature of the rim at the rearward side of the rotation at the flank of the arc-shaped cutting edge was set at 13 mm. The radius of curvature of the arc-shaped cutting edge was made to be 0.8 times the radius of curvature of the rim at the rearward side of the rotation at the flank of the arc-shaped cutting edge.

As a method of evaluation, roughing of a pocket shape was performed by contour machining, as in Example 1, and the state of damage of the tools were compared. As a standard of evaluation for the cutting test, those with an abrasion width of less than 0.08 mm at the flank of the bottom edge, without any fractures, were evaluated as Good. The test results are shown in Table 2.

of curvature of the arc-shaped cutting edge is large, chip removability deteriorates, resulting in a tendency of increased abrasion.

Example 3

In Example 3, in order to confirm the relationship between the radius of curvature of the arc-shaped cutting edge and the tool radius, a cutting test was performed by cutting a pocket shape, as in Example 1.

In Example 3, Present Invention Examples 11 to 17 were used. As common dimensions of the end mill form, as in Present Invention Example 1 used in Example 1, an end mill with the bottom edge and the peripheral edge connected together, with a tool diameter D of 10 mm, a core diameter of 7.5 mm, an angle of torsion of the peripheral edge of 20 degrees, number of cutting edges of 6, a radius of curvature of the rim at the rearward side of the rotation at the flank of the arc-shaped cutting edge set at 2.6 times the tool radius, or 13 mm, a coating of TiSiN-type, and a base material of cemented carbide, was prepared.

For Present Invention Example 11, one with a radius of curvature of the arc-shaped cutting edge set at 5 mm, and the

TABLE 2

| Sample Number | | Radius of Curvature of Arc-shaped Cutting Edge Ra (mm) | Radius of Curvature of Rim at Rearward Side of Rotation Rb (mm) | Ratio of Ra and Rb | Abrasion Width (mm) | Fracture |
|---|---|---|---|---|---|---|
| Present Invention Example | 4 | 2.6 | 13 | 0.2 | 0.077 | None |
| Present Invention Example | 5 | 3.9 | 13 | 0.3 | 0.069 | None |
| Present Invention Example | 6 | 5.2 | 13 | 0.4 | 0.060 | None |
| Present Invention Example | 7 | 6.5 | 13 | 0.5 | 0.048 | None |
| Present Invention Example | 8 | 7.8 | 13 | 0.6 | 0.061 | None |
| Present Invention Example | 9 | 9.1 | 13 | 0.7 | 0.067 | None |
| Present Invention Example | 10 | 10.4 | 13 | 0.8 | 0.076 | None |

As a result, in Present Invention Examples 4 to 10, the abrasion widths of the flank of the bottom edge were all under 0.08 mm and good results without fractures were obtained. In Present Invention Examples 5 to 9, in which the radius of curvature of the arc-shaped cutting edge was set at 0.3 times or above to 0.7 times or below the radius of curvature of the rim at the rearward side of the rotation at the flank of the arc-shaped cutting edge, the abrasion widths were 0.07 mm or less, and better results were obtained. In Present Invention Example 7, which was prepared with the radius of curvature of the arc-shaped cutting edge set at 6.5 mm, or 0.5 times the radius of curvature of the rim at the rearward side of the rotation at the flank of the arc-shaped cutting edge, the abrasion width was smallest at 0.048 mm. When the radius of curvature of the arc-shaped cutting edge is small, the rigidity of the edge deteriorates, and abrasion due to vibration tends to increase. Further, when the radius radius of curvature of the arc-shaped cutting edge set at 1.0 times the tool radius R, was prepared.

For Present Invention Example 12, one with a radius of curvature of the arc-shaped cutting edge set at 5.5 mm, and the radius of curvature of the arc-shaped cutting edge set at 1.1 times the tool radius R, was prepared.

For Present Invention Example 13, one with a radius of curvature of the arc-shaped cutting edge set at 6 mm, and the radius of curvature of the arc-shaped cutting edge set at 1.2 times the tool radius R, was prepared.

For Present Invention Example 14, one with a radius of curvature of the arc-shaped cutting edge set at 6.5 mm, and the radius of curvature of the arc-shaped cutting edge set at 1.3 times the tool radius R, was prepared.

For Present Invention Example 15, one with a radius of curvature of the arc-shaped cutting edge set at 7 mm, and the radius of curvature of the arc-shaped cutting edge set at 1.4 times the tool radius R, was prepared.

For Present Invention Example 16, one with a radius of curvature of the arc-shaped cutting edge set at 7.5 mm, and the radius of curvature of the arc-shaped cutting edge set at 1.5 times the tool radius R, was prepared.

For Present Invention Example 17, one with a radius of curvature of the arc-shaped cutting edge set at 8 mm, and the radius of curvature of the arc-shaped cutting edge set at 1.6 times the tool radius R, was prepared.

As a method of evaluation, roughing of a pocket shape was performed by contour machining, as in Example 1, and the state of damage of the tools were compared. As a standard of evaluation for the cutting test, those with an abrasion width of less than 0.08 mm at the flank of the bottom edge, without any fractures, were evaluated as Good. The test results are shown in Table 3.

TABLE 3

| Sample Number | Tool Radius R (mm) | Radius of Curvature of Arc-shaped Cutting Edge Ra (mm) | Ratio of Ra and Rb | Abrasion Width (mm) | Fracture |
|---|---|---|---|---|---|
| Present Invention Example | 11 | 5 | 5 | 1.0 | 0.063 | None |
| Present Invention Example | 12 | 5 | 5.5 | 1.1 | 0.060 | None |
| Present Invention Example | 13 | 5 | 6 | 1.2 | 0.055 | None |
| Present Invention Example | 14 | 5 | 6.5 | 1.3 | 0.051 | None |
| Present Invention Example | 15 | 5 | 7 | 1.4 | 0.056 | None |
| Present Invention Example | 16 | 5 | 7.5 | 1.5 | 0.059 | None |
| Present Invention Example | 17 | 5 | 8 | 1.6 | 0.075 | None |

As a result, in Present Invention Examples 11 to 17 the abrasion widths of the flank of the bottom edge were all under 0.08 mm and good results without fractures were obtained. Further, in Present Invention Examples 12 to 16, in which the radius of curvature of the arc-shaped cutting edge were set at 1.1 times or above to 1.5 times or below the tool radius, the abrasion widths were 0.06 mm or less, and better results were obtained. In Present Invention Example 14, in which the radius of curvature of the arc-shaped cutting edge was set at 6.5 mm, or 1.3 times the tool radius, the abrasion width was smallest at 0.051 mm. When the radius of curvature of the arc-shaped cutting edge is small, a tendency of larger abrasion was seen, while at the same time, when the radius of curvature of the arc-shaped cutting edge is made to be large, a tendency of larger abrasion was seen, due to the increase in cutting resistance.

Example 4

In Example 4, in order to confirm the relationship between the radius of curvature of the rim at the rearward side of the rotation at the flank of the arc-shaped cutting edge and the tool radius, a cutting test was performed by cutting a pocket shape, as in Example 1.

In Example 4, Present Invention Examples 18 to 24 were used. As common dimensions of the end mill form, as in Present Invention Example 1 used in Example 1, an end mill with the bottom edge and the peripheral edge connected together, with a tool diameter D of 10 mm, a core diameter of 7.5 mm, an angle of torsion of the peripheral edge of 20 degrees, a number of cutting edges of 6, a radius of curvature of the arc-shaped cutting edge set at 1.3 times the tool radius, or 6.5 mm, a coating of TiSiN-type and a base material of cemented carbide, was prepared.

In Present Invention Example 18, the radius of curvature of the rim at the rearward side of the rotation at the flank of the arc-shaped cutting edge was set at 7.5 mm, and the radius of curvature of the rim at the rearward side of the rotation at the flank of the arc-shaped cutting edge was set as 1.5 times the tool radius R.

In Present Invention Example 19, the radius of curvature of the rim at the rearward side of the rotation at the flank of the arc-shaped cutting edge was set at 10 mm, and the radius of curvature of the rim at the rearward side of the rotation at the flank of the arc-shaped cutting edge was set as 2.0 times the tool radius R.

In Present Invention Example 20, the radius of curvature of the rim at the rearward side of the rotation at the flank of the arc-shaped cutting edge was set at 12.5 mm, and the radius of curvature of the rim at the rearward side of the rotation at the flank of the arc-shaped cutting edge was set as 2.5 times the tool radius R.

In Present Invention Example 21, the radius of curvature of the rim at the rearward side of the rotation at the flank of the arc-shaped cutting edge was set at 15 mm, and the radius of curvature of the rim at the rearward side of the rotation at the flank of the arc-shaped cutting edge was set as 3.0 times the tool radius R.

In Present Invention Example 22, the radius of curvature of the rim at the rearward side of the rotation at the flank of the arc-shaped cutting edge was set at 17.5 mm, and the radius of curvature of the rim at the rearward side of the rotation at the flank of the arc-shaped cutting edge was set as 3.5 times the tool radius R.

In Present Invention Example 23, the radius of curvature of the rim at the rearward side of the rotation at the flank of the arc-shaped cutting edge was set at 20 mm, and the radius of curvature of the rim at the rearward side of the rotation at the flank of the arc-shaped cutting edge was set as 4.0 times the tool radius R.

In Present Invention Example 24, the radius of curvature of the rim at the rearward side of the rotation at the flank of the arc-shaped cutting edge was set at 22.5 mm, and the radius of curvature of the rim at the rearward side of the rotation at the flank of the arc-shaped cutting edge was set as 4.5 times the tool radius R.

As a method of evaluation, roughing of a pocket shape was performed by contour machining, as in Example 1, and the state of damage of the tools were compared. As a standard of evaluation for the cutting test, those with an abrasion width of less than 0.08 mm at the flank of the bottom edge, without any fractures, were evaluated as Good. The test results are shown in Table 4.

TABLE 4

| Sample Number | Tool Radius R (mm) | Radius of Curvature of Rim at Rearward Side of Rotation Rb (mm) | Ratio of Ra and Rb | Abrasion Width (mm) | Fracture |
|---|---|---|---|---|---|
| Present Invention Example | 18 | 5 | 7.5 | 1.5 | 0.077 | None |

TABLE 4-continued

| Sample Number | Tool Radius R (mm) | Radius of Curvature of Rim at Rearward Side of Rotation Rb (mm) | Ratio of Ra and Rb | Abrasion Width (mm) | Fracture |
|---|---|---|---|---|---|
| Present Invention Example | 19 | 5 | 10 | 2.0 | 0.064 | None |
| Present Invention Example | 20 | 5 | 12.5 | 2.5 | 0.058 | None |
| Present Invention Example | 21 | 5 | 15 | 3.0 | 0.050 | None |
| Present Invention Example | 22 | 5 | 17.5 | 3.5 | 0.062 | None |
| Present Invention Example | 23 | 5 | 20 | 4.0 | 0.069 | None |
| Present Invention Example | 24 | 5 | 22.5 | 4.5 | 0.078 | None |

As a result, in Present Invention Examples 18 to 24 the abrasion widths of the flank of the bottom edge were all under 0.08 mm and good results without fractures were obtained. Further, in Present Invention Examples 19 to 23, in which the radius of curvature of the rim at the rearward side of the rotation at the flank of the arc-shaped cutting edge was set at 2.0 times or above to 4.0 times or below the tool radius, the abrasion widths were 0.07 mm or less, and particularly good results were obtained. In Present Invention Example 21, in which the radius of curvature of the rim at the rearward side of the rotation at the flank of the arc-shaped cutting edge was set at 15 mm, and the radius of curvature of the rim at the rearward side of the rotation at the flank of the arc-shaped cutting edge was set at 3.0 times the tool radius, the abrasion width was smallest at 0.050 mm. When the radius of curvature of the arc-shaped cutting edge is small, a tendency of larger abrasion was seen, while at the same time, when the radius of curvature of the arc-shaped cutting edge is made to be large, a tendency of larger abrasion was seen, due to an increase in cutting resistance.

Example 5

In Example 5, in order to confirm the effectiveness of the R edge connecting the bottom edge and the peripheral edge, a cutting test was performed.

In Example 5, Present Invention Examples 25 to 32 were used. As common dimensions of the end mill form, as in Present Invention Example 1 used in Example 1, an end mill with the bottom edge and the peripheral edge connected together, with a tool diameter D of 10 mm, a core diameter of 7.5 mm, an angle of torsion of the peripheral edge of 20 degrees, number of cutting edges of 6, a radius of curvature of the arc-shaped cutting edge set at 1.3 times the tool radius, or 6.5 mm, a radius of curvature of the rim at the rearward side of the rotation at the flank of the arc-shaped cutting edge set at 2.6 times the tool radius, or 13 mm, a coating of TiSiN-type, and a base material of cemented carbide, was prepared.

For Present Invention Example 25, an end mill similar to that of Present Invention Example 1, without an R edge that connects the bottom edge and the peripheral edge, was prepared.

For Present Invention Example 26, one composed with an R edge that connects the bottom edge and the peripheral edge, wherein the radius of curvature of the R edge was set at 0.05 mm, or 0.01 times the tool radius, was prepared.

For Present Invention Example 27, one composed with an R edge that connects the bottom edge and the peripheral edge, wherein the radius of curvature of the R edge was set at 0.1 mm, or 0.02 times the tool radius, was prepared.

For Present Invention Example 28, one composed with an R edge that connects the bottom edge and the peripheral edge, wherein the radius of curvature of the R edge was set at 0.25 mm, or 0.05 times the tool radius, was prepared.

For Present Invention Example 29, one composed with an R edge that connects the bottom edge and the peripheral edge, wherein the radius of curvature of the R edge was set at 0.5 mm, or 0.10 times the tool radius, was prepared.

For Present Invention Example 30, one composed with an R edge that connects the bottom edge and the peripheral edge, wherein the radius of curvature of the R edge was set at 0.75 mm, or 0.15 times the tool radius, was prepared.

For Present Invention Example 31, one composed with an R edge that connects the bottom edge and the peripheral edge, wherein the radius of curvature of the R edge was set at 1.0 mm, or 0.20 times the tool radius, was prepared.

For Present Invention Example 32, one composed with an R edge that connects the bottom edge and the peripheral edge, wherein the radius of curvature of the R edge was set at 1.25 mm, or 0.25 times the tool radius, was prepared.

As a method of evaluation, roughing of a pocket shape was performed by contour machining, as in Example 1, and damages to the connective part of the bottom edge and the peripheral edge (for those composed with an R edge, the connective part of the R edge and the peripheral edge) were compared. Note that the pocket size was set as 40 mm in depth, 200 mm in length, and 25 mm in width, and the angle of inclination of the side was 1°. For the evaluation of the R edge that connects the bottom edge and the peripheral edge, the cutting amount along the side wall was increased, and a shape in which the R edge was likely to come in contact with the work material was used. For this reason, the dimension of the work material was changed to 60 mm in height, 220 mm in length, and 45 mm in width. Since the machining volume was the same as that of Example 1, as a standard for the evaluation of the cutting test, those with an abrasion width of less than 0.08 mm at the flank of the bottom edge, without any fractures, were evaluated as Good, as in Example 1. The test results are shown in Table 5.

TABLE 5

| Sample Number | Tool Radius R (mm) | Presence of R Edge | Radius of Curvature of R Edge (mm) | Ratio of Tool Radius and Radius of Curvature of R Edge | Abrasion Width of Bottom Edge (mm) | Fracture of Bottom Edge | Abrasion Width of R Edge | Fracture of Connective Part of Bottom Edge and Peripheral Edge |
|---|---|---|---|---|---|---|---|---|
| Present Invention Example 25 | 5 | None | — | — | 0.077 | None | — | Slightly Present |
| Present Invention Example 26 | 5 | Yes | 0.05 | 0.01 | 0.071 | None | 0.060 | None |
| Present Invention Example 27 | 5 | Yes | 0.10 | 0.02 | 0.060 | None | 0.054 | None |
| Present Invention Example 28 | 5 | Yes | 0.25 | 0.05 | 0.051 | None | 0.048 | None |
| Present Invention Example 29 | 5 | Yes | 0.50 | 0.10 | 0.058 | None | 0.058 | None |
| Present Invention Example 30 | 5 | Yes | 0.75 | 0.15 | 0.067 | None | 0.070 | None |
| Present Invention Example 31 | 5 | Yes | 1.00 | 0.20 | 0.070 | None | 0.077 | None |
| Present Invention Example 32 | 5 | Yes | 1.25 | 0.25 | 0.076 | None | 0.079 | None |

As a result, in Present Invention Examples 25 to 32 the abrasion widths of the flanks were all under 0.08 mm and good results without fractures were obtained. Further, in Present Invention Examples 27 to 31, in which the radius of curvature of the R edge were set at 0.02 times or above to 0.2 times or below the tool radius, the abrasion widths were all 0.07 mm or less, and no fractures to the bottom edge were observed. Further, the abrasion widths of the flank of the R edge were all under 0.08 mm and no fractures were observed in the connective part of the bottom edge and the peripheral edge, and thus, particularly good results were obtained.

Example 6

In Example 6, in order to confirm the effectiveness of the chamfer end cutting edge connecting the bottom edge and the peripheral edge, a cutting test was performed.

In Example 6, Present Invention Examples 33 to 40 were used. As common dimensions of the end mill form, as in Present Invention Example 1 used in Example 1, an end mill with a tool diameter D of 10 mm, a core diameter of 7.5 mm, an angle of torsion of the peripheral edge of 20 degrees, number of cutting edges of 6, a radius of curvature of the arc-shaped cutting edge set at 1.3 times the tool radius, or 6.5 mm, a radius of curvature of the rim at the rearward side of the rotation at the flank of the arc-shaped cutting edge set at 2.6 times the tool radius, or 13 mm, a coating of TiSiN-type, and a base material of cemented carbide, was prepared.

For Present Invention Example 33, an end mill similar to that of Present Invention Example 1, wherein the bottom edge and the peripheral edge are connected, without a chamfer end cutting edge that connects the bottom edge and the peripheral edge, was prepared.

For Present Invention Example 34, one composed with a chamfer end cutting edge that connects the bottom edge and the peripheral edge, wherein the width of the chamfer end cutting edge was set at 0.05 mm, or 0.01 times the tool radius, was prepared.

For Present Invention Example 35, one composed with a chamfer end cutting edge that connects the bottom edge and the peripheral edge, wherein the width of the chamfer end cutting edge was set at 0.1 mm, or 0.02 times the tool radius, was prepared.

For Present Invention Example 36, one composed with a chamfer end cutting edge that connects the bottom edge and the peripheral edge, wherein the width of the chamfer end cutting edge was set at 0.25 mm, or 0.05 times the tool radius, was prepared.

For Present Invention Example 37, one composed with a chamfer end cutting edge that connects the bottom edge and the peripheral edge, wherein the width of the chamfer end cutting edge was set at 0.5 mm, or 0.10 times the tool radius, was prepared.

For Present Invention Example 38, one composed with a chamfer end cutting edge that connects the bottom edge and the peripheral edge, wherein the width of the chamfer end cutting edge was set at 0.75 mm, or 0.15 times the tool radius, was prepared.

For Present Invention Example 39, one composed with a chamfer end cutting edge that connects the bottom edge and the peripheral edge, wherein the width of the chamfer end cutting edge was set at 1.0 mm, or 0.20 times the tool radius, was prepared.

For Present Invention Example 40, one composed with a chamfer end cutting edge that connects the bottom edge and the peripheral edge, wherein the width of the chamfer end cutting edge was set at 1.25 mm, or 0.25 times the tool radius, was prepared.

As a method of evaluation, roughing of a pocket shape was performed by contour machining, as in Example 5, and damages to the connective part of the bottom edge and the peripheral edge (for those composed with a chamfer end cutting edge, the connective part of the chamfer end cutting edge and the peripheral edge) were compared. As a standard for the evaluation of the cutting test, those with an abrasion width of less than 0.08 mm at the flank of the bottom edge, without any fractures, were evaluated as Good. The test results are shown in Table 6.

TABLE 6

| Sample Number | Tool Radius R (mm) | Presence of Chamfer End Cutting Edge | Width of Chamfer End Cutting Edge | Ratio of Tool Radius and Chamfer End Cutting Edge | Abrasion Width of Bottom Edge (mm) | Fracture of Bottom Edge | Abrasion Width of Chamfer End Cutting Edge | Fracture of Connective Part of Bottom Edge and Peripheral Edge |
|---|---|---|---|---|---|---|---|---|
| Present Invention Example 33 | 5 | None | — | — | 0.074 | None | — | Slightly Present |
| Present Invention Example 34 | 5 | Yes | 0.05 | 0.01 | 0.068 | None | 0.058 | None |
| Present Invention Example 35 | 5 | Yes | 0.10 | 0.02 | 0.060 | None | 0.054 | None |
| Present Invention Example 36 | 5 | Yes | 0.25 | 0.05 | 0.050 | None | 0.048 | None |
| Present Invention Example 37 | 5 | Yes | 0.50 | 0.10 | 0.058 | None | 0.058 | None |
| Present Invention Example 38 | 5 | Yes | 0.75 | 0.15 | 0.067 | None | 0.070 | None |
| Present Invention Example 39 | 5 | Yes | 1.00 | 0.20 | 0.068 | None | 0.075 | None |
| Present Invention Example 40 | 5 | Yes | 1.25 | 0.25 | 0.078 | None | 0.078 | None |

As a result, in Present Invention Examples 33 to 40, the abrasion widths of the flank of the bottom edge were all under 0.08 mm and good results without fractures were obtained. Further, in Present Invention Examples 35 to 39, in which the width of the chamfer end cutting edge were set at 0.02 times or above to 0.2 times or below the tool radius R, the abrasion widths were 0.07 mm or less, and no fractures to the bottom edge were observed. Further, the abrasion widths of the flank of the chamfer end cutting edge were all under 0.08 mm and no fractures were observed in the connective part of the bottom edge and the peripheral edge, and thus, particularly good results were obtained.

Example 7

In order to confirm the advantages of the end mill of the present invention, a cutting test was performed by cutting a pocket shape. For the cutting test, Present Invention Examples, Comparative Examples, and Conventional Examples were used. The specifications of each tool were as follows.

In Example 7, Present Invention Examples 42 to 49, Present Invention Examples 52 to 56, Present Invention Examples 59 to 63, Comparative Examples 41, 50, 51, 57, 58, 64, and Conventional Examples 65, 66 were used. As common dimensions of the end mill form, an end mill with a tool diameter D of 10 mm, a core diameter of 7.5 mm, an angle of torsion of the peripheral edge of 20 degrees, a number of cutting edges of 6, a coating of TiSiN-type, and a base material of cemented carbide, was prepared. Further, for Present Invention Examples 42 to 49, Present Invention Examples 52 to 56, and Present Invention Examples 59 to 63, the center distance of the arc, which is the distance of the center of the arc composing the arc-shaped cutting edge of the main bottom edge, measured in a direction perpendicular to the tool axis O from the tool axis, was set at 0.15 times the tool diameter, or 1.5 mm. The main bottom edge was connected to the main peripheral edge, and the sub-bottom edge was connected to the sub-peripheral edge.

In Present Invention Examples 42 to 49, Comparative Example 41 and Comparative Example 50, end mills with various radii of curvatures of the arc-shaped cutting edge of the main bottom edge R1 were prepared.

For Comparative Example 41, an end mill with the following features was prepared: the radius of curvature of the arc-shaped cutting edge of the main bottom edge R1 was set at 1.0 times the tool radius, or 5 mm; the undersized amount of the peripheral edge was set at 0.006 times the tool diameter, or 0.06 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.005 times the tool diameter, or 0.05 mm.

For Present Invention Example 42, an end mill with the following features was prepared: the radius of curvature of the arc-shaped cutting edge of the main bottom edge R1 was set at 1.5 times the tool radius, or 7.5 mm; the undersized amount of the peripheral edge was set at 0.006 times the tool diameter, or 0.06 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.005 times the tool diameter, or 0.05 mm.

For Present Invention Example 43, an end mill with the following features was prepared: the radius of curvature of the arc-shaped cutting edge of the main bottom edge R1 was set at 2.0 times the tool radius, or 10 mm; the undersized amount of the peripheral edge was set at 0.006 times the tool diameter, or 0.06 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.005 times the tool diameter, or 0.05 mm.

For Present Invention Example 44, an end mill with the following features was prepared: the radius of curvature of the arc-shaped cutting edge of the main bottom edge R1 was set at 2.5 times the tool radius, or 12.5 mm; the undersized amount of the peripheral edge was set at 0.006 times the tool diameter, or 0.06 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.005 times the tool diameter, or 0.05 mm.

For Present Invention Example 45, an end mill with the following features was prepared: the radius of curvature of the arc-shaped cutting edge of the main bottom edge R1 was set at 3.0 times the tool radius, or 15 mm; the undersized amount of the peripheral edge was set at 0.006 times the tool diameter, or 0.06 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.005 times the tool diameter, or 0.05 mm.

For Present Invention Example 46, an end mill with the following features was prepared: the radius of curvature of the arc-shaped cutting edge of the main bottom edge R1 was set at 3.5 times the tool radius, or 17.5 mm; the undersized amount of the peripheral edge was set at 0.006 times the tool diameter, or 0.06 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.005 times the tool diameter, or 0.05 mm.

For Present Invention Example 47, an end mill with the following features was prepared: the radius of curvature of the arc-shaped cutting edge of the main bottom edge R1 was set at 4.0 times the tool radius, or 20 mm; the undersized amount of the peripheral edge was set at 0.006 times the tool diameter, or 0.06 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.005 times the tool diameter, or 0.05 mm.

For Present Invention Example 48, an end mill with the following features was prepared: the radius of curvature of the arc-shaped cutting edge of the main bottom edge R1 was set at 4.5 times the tool radius, or 22.5 mm; the undersized amount of the peripheral edge was set at 0.006 times the tool diameter, or 0.06 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.005 times the tool diameter, or 0.05 mm.

For Present Invention Example 49, an end mill with the following features was prepared: the radius of curvature of the arc-shaped cutting edge of the main bottom edge R1 was set at 5.0 times the tool radius, or 25 mm; the undersized amount of the peripheral edge was set at 0.006 times the tool diameter, or 0.06 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.005 times the tool diameter, or 0.05 mm.

For Comparative Example 50, an end mill with the following features was prepared: the radius of curvature of the arc-shaped cutting edge of the main bottom edge R1 was set at 5.5 times the tool radius, or 27.5 mm; the undersized amount of the peripheral edge was set at 0.006 times the tool diameter, or 0.06 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.005 times the tool diameter, or 0.05 mm.

In Present Invention Examples 52 to 56, Comparative Example 51 and Comparative Example 57, end mills with various maximum undersized amounts, which is the largest undersized amount of the bottom edge, or various minimum undersized amounts, which is the smallest undersized amount of the bottom edge, were prepared.

For Comparative Example 51, an end mill with the following features was prepared: the radius of curvature of the arc-shaped cutting edge of the main bottom edge R1 was set at 3.0 times the tool radius, or 15 mm; the undersized amount of the peripheral edge was set at 0.006 times the tool diameter, or 0.06 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.002 times the tool diameter, or 0.02 mm.

For Present Invention Example 52, an end mill with the following features was prepared: the radius of curvature of the arc-shaped cutting edge of the main bottom edge R1 was set at 3.0 times the tool radius, or 15 mm; the undersized amount of the peripheral edge was set at 0.006 times the tool diameter, or 0.06 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.0025 times the tool diameter, or 0.025 mm.

For Present Invention Example 53, an end mill with the following features was prepared: the radius of curvature of the arc-shaped cutting edge of the main bottom edge R1 was set at 3.0 times the tool radius, or 15 mm; the undersized amount of the peripheral edge was set at 0.006 times the tool diameter, or 0.06 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.005 times the tool diameter, or 0.05 mm.

For Present Invention Example 54, an end mill with the following features was prepared: the radius of curvature of the arc-shaped cutting edge of the main bottom edge R1 was set at 3.0 times the tool radius, or 15 mm; the undersized amount of the peripheral edge was set at 0.006 times the tool diameter, or 0.06 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.007 times the tool diameter, or 0.07 mm.

For Present Invention Example 55, an end mill with the following features was prepared: the radius of curvature of the arc-shaped cutting edge of the main bottom edge R1 was set at 3.0 times the tool radius, or 15 mm; the undersized amount of the peripheral edge was set at 0.006 times the tool diameter, or 0.06 mm; the maximum undersized amount, which is the largest undersized amount of the bottom edge, was set at 0.0075 times the tool diameter, or 0.075 mm; the minimum undersized amount, which is the smallest undersized amount of the bottom edge, was set at 0.007 times the tool diameter, or 0.07 mm.

For Present Invention Example 56, an end mill with the following features was prepared: the radius of curvature of the arc-shaped cutting edge of the main bottom edge R1 was set at 3.0 times the tool radius, or 15 mm; the undersized amount of the peripheral edge was set at 0.006 times the tool diameter, or 0.06 mm; the maximum undersized amount, which is the largest undersized amount of the bottom edge, was set at 0.01 times the tool diameter, or 0.1 mm; the minimum undersized amount, which is the smallest undersized amount of the bottom edge, was set at 0.007 times the tool diameter, or 0.07 mm.

For Comparative Example 57, an end mill with the following features was prepared: the radius of curvature of the arc-shaped cutting edge of the main bottom edge R1 was set at 3.0 times the tool radius, or 15 mm; the undersized amount of the peripheral edge was set at 0.006 times the tool diameter, or 0.06 mm; the maximum undersized amount, which is the largest undersized amount of the bottom edge, was set at 0.0125 times the tool diameter, or 0.125 mm; the minimum undersized amount, which is the smallest undersized amount of the bottom edge, was set at 0.007 times the tool diameter, or 0.07 mm.

In Present Invention Examples 59 to 63, Comparative Example 58 and Comparative Example 64, end mills with various undersized amounts of the peripheral edge were prepared.

For Comparative Example 58, an end mill with the following features was prepared: the radius of curvature of the arc-shaped cutting edge of the main bottom edge R1 was set at 3.0 times the tool radius, or 15 mm; the undersized amount of the peripheral edge was set at 0.002 times the tool diameter, or 0.02 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.007 times the tool diameter, or 0.07 mm.

For Present Invention Example 59, an end mill with the following features was prepared: the radius of curvature of the arc-shaped cutting edge of the main bottom edge R1 was set at 3.0 times the tool radius, or 15 mm; the undersized amount of the peripheral edge was set at 0.0025 times the tool diameter, or 0.025 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.007 times the tool diameter, or 0.07 mm.

For Present Invention Example 60, an end mill with the following features was prepared: the radius of curvature of the arc-shaped cutting edge of the main bottom edge R1 was set at 3.0 times the tool radius, or 15 mm; the undersized amount of the peripheral edge was set at 0.005 times the tool diameter, or 0.05 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.007 times the tool diameter, or 0.07 mm.

For Present Invention Example 61, an end mill with the following features was prepared: the radius of curvature of the arc-shaped cutting edge of the main bottom edge R1 was set at 3.0 times the tool radius, or 15 mm; the undersized amount of the peripheral edge was set at 0.007 times the tool diameter, or 0.07 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.007 times the tool diameter, or 0.07 mm.

For Present Invention Example 62, an end mill with the following features was prepared: the radius of curvature of the arc-shaped cutting edge of the main bottom edge R1 was set at 3.0 times the tool radius, or 15 mm; the undersized amount of the peripheral edge was set at 0.0075 times the tool diameter, or 0.075 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.007 times the tool diameter, or 0.07 mm.

For Present Invention Example 63, an end mill with the following features was prepared: the radius of curvature of the arc-shaped cutting edge of the main bottom edge R1 was set at 3.0 times the tool radius, or 15 mm; the undersized amount of the peripheral edge was set at 0.01 times the tool diameter, or 0.1 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.007 times the tool diameter, or 0.07 mm.

As Comparative Example 64, an end mill with the following features was prepared: the radius of curvature of the arc-shaped cutting edge of the main bottom edge R1 was set at 3.0 times the tool radius, or 15 mm; the undersized amount of the peripheral edge was set at 0.0125 times the tool diameter, or 0.125 mm; the maximum undersized amount, which is the largest undersized amount of the bottom edge, was set at 0.007 times the tool diameter, or 0.07 mm; the minimum undersized amount, which is the smallest undersized amount of the bottom edge, was set at 0.007 times the tool diameter, or 0.07 mm.

As Conventional Example 65, a ball end mill with 6 edges was prepared. Further, as Conventional Example 66, a radius end mill with 6 corner R edges with a radius of 2 mm was prepared.

As a method of evaluation, roughing of a pocket shape was performed by contour machining, and the state of damage of the tools were compared. The conditions of the cutting test were of unified condition for each sample number. The work material was a block of hardened material of SKD11 (62HRC), and the dimensions of the work material was 60 mm in height, 120 mm in length, and 70 mm in width. The rotational frequency of the end mill was 2200 rpm (cutting rate: 70 m/min), the feed rate was 3300 mm/min (per-edge feed rate: 0.25 mm/edge), axial direction cutting depth was 0.2 mm, radial direction cutting depth was 5 mm, and air blow was used. The machining shape was of a pocket shape that includes a corner shape where vibration tends to occur. The dimension of the pocket was 40 mm in depth, 100 mm in length, and 50 mm in width, and the inclination angle of the side was 1°. For the conventional end mill, tool life made the cutting of two pockets under the above conditions difficult. Thus, to evaluate the machine life of the samples prepared, cutting for up to two pockets were performed under the same conditions, and the abrasion width was measured using an optical microscope by observing the presence or lack of fractures in the bottom edge by sight.

As a standard for the evaluation of the cutting test, those with an abrasion width of less than 0.08 mm at the flank of the bottom edge, without any fractures, were evaluated as Good. The test results are shown in Table 7.

TABLE 7

| Sample Number | | Radius of Curvature of Arc-shaped Cutting Edge of Main Bottom Edge | Undersized Amount of Peripheral Edge | Undersized Amount of Bottom Edge | | Abrasion Width | Fracture |
|---|---|---|---|---|---|---|---|
| | | | | Maximum Undersized Amount | Minimum Undersized Amount | | |
| Comparative Example | 41 | 1.0 times (5 mm) | 0.006 times (0.06 mm) | 0.007 times (0.07 mm) | 0.005 times (0.05 mm) | — | Yes |
| Present Invention Example | 42 | 1.5 times (7.5 mm) | | | | 0.067 mm | None |
| Present Invention Example | 43 | 2.0 times (10 mm) | | | | 0.054 mm | None |
| Present Invention Example | 44 | 2.5 times (12.5 mm) | | | | 0.048 mm | None |
| Present Invention Example | 45 | 3.0 times (15 mm) | | | | 0.040 mm | None |
| Present Invention Example | 46 | 3.5 times (17.5 mm) | | | | 0.052 mm | None |
| Present Invention Example | 47 | 4.0 times (20 mm) | | | | 0.059 mm | None |
| Present Invention Example | 48 | 4.5 times (22.5 mm) | | | | 0.068 mm | None |
| Present Invention Example | 49 | 5.0 times (25 mm) | | | | 0.075 mm | None |
| Comparative Example | 50 | 5.5 times (27.5 mm) | | | | 0.115 mm | None |
| Comparative Example | 51 | 3.0 times (15 mm) | | | 0.002 times (0.02 mm) | — | Yes |
| Present Invention Example | 52 | | | | 0.0025 times (0.025 mm) | 0.063 mm | None |
| Present Invention Example | 53 | | | | 0.005 times (0.05 mm) | 0.045 mm | None |
| Present invention Example | 54 | | | | 0.007 times (0.07 mm) | 0.035 mm | None |
| Present Invention Example | 55 | | | 0.0075 times (0.075 mm) | | 0.041 mm | None |
| Present Invention Example | 56 | | | 0.01 times (0.1 mm) | | 0.067 mm | None |
| Comparative Example | 57 | | | 0.0125 times (0.125 mm) | | — | Yes |
| Comparative Example | 58 | | 0.002 times (0.02 mm) | 0.007 times (0.07 mm) | | — | Yes |
| Present Invention Example | 59 | | 0.0025 times (0.025 mm) | | | 0.062 mm | None |
| Present Invention Example | 60 | | 0.005 times (0.05 mm) | | | 0.051 mm | None |
| Present Invention Example | 61 | | 0.007 times (0.07 mm) | | | 0.045 mm | None |
| Present Invention Example | 62 | | 0.0075 times (0.075 mm) | | | 0.047 mm | None |
| Present Invention Example | 63 | | 0.01 times (0.1 mm) | | | 0.065 mm | None |
| Comparative Example | 64 | | 0.0125 times (0.125 mm) | | | — | Yes |
| Conventional Example | 65 | — | — | — | — | 0.183 mm | None |
| Conventional Example | 66 | — | — | — | — | — | Yes |

As a result, in Present Invention Examples 42 to 49, Present Invention Examples 52 to 56, and Present Invention Examples 59 to 63, the abrasion widths of the flanks were all under 0.08 mm and good results without fractures were obtained.

In contrast, in Comparative Example 41, because the radius of curvature of the arc-shaped cutting edge of the main bottom edge R1 was small, fractures were detected, due to lack of main bottom edge strength.

In Comparative Example 50, because the radius of curvature of the arc-shaped cutting edge of the main bottom edge R1 was large, cutting heat increased causing abrasion to progress quickly. Thus, the abrasion width of the flank of the bottom edge was 0.115 mm.

In Comparative Example 51, because the minimum undersized amount of the bottom edge was small at 0.02 mm, the effect of vibration suppression during the machining of corners became small, causing fractures.

In Comparative Example 57, because the maximum undersized amount of the bottom edge was large at 0.125 mm, the cutting amount of the main bottom edge became large, compared to that of the sub-bottom edge, and fractures occurred in the main bottom edge.

In Comparative Example 58, because the undersized amount of the peripheral edge was small at 0.02 mm, the effect of vibration suppression during the machining of corners was small, causing fractures.

In Comparative Example 64, because the undersized amount of the peripheral edge was large at 0.125 mm, the cutting amount of the main peripheral edge became much larger than that of the sub-peripheral edge, and fractures occurred in the main bottom edge.

Since Conventional Example 65 was a ball end mill, the cutting amount became large at the vicinity of the center, and cutting rate could not be increased. Thus, machinability deteriorated, and the abrasion width of the flank became extremely large at 0.183 mm.

Since Conventional Example 66 was a radius end mill, the radius of the corner. R edge was as small as 2 mm. Thus, as with Comparative Example 1, fractures occurred due to lack of sufficient strength.

Example 8

In Example 8, the cutting life for end mills with various center distances, which is the distance of the center of the arc constituting the arc-shaped cutting edge of the main bottom edge, measured in a direction perpendicular to the tool axis O, as well as and those with or without a chamfer end cutting edge or an arc-shaped R edge, were compared. The specifications of each tool were as follows.

In Example 8, Present Invention Examples 67 to 75 were used. As common dimensions of the end mill form, an end mill with a tool diameter D of 10 mm, a core diameter of 7.5 mm, an angle of torsion of the peripheral edge of 20 degrees, a number of cutting edges of 6, a coating of TiSiN-type, and a base material of cemented carbide, was prepared. Further, in Present Invention Examples 67 to 75, the radius of curvature of the arc-shaped cutting edge of the main bottom edge R1 was set at 3.0 times the tool radius, or 15 mm, the undersized amount of the peripheral edge was set at 0.006 times the tool diameter, or 0.06 mm, the maximum undersized amount, which is the largest undersized amount of the bottom edge, was set at 0.007 times the tool diameter, or 0.07 mm, and the minimum undersized amount, which is the smallest undersized amount of the bottom edge, was set at 0.007 times the tool diameter, or 0.07 mm.

For Present Invention Examples 67 to 73, end mills with varying center distance of the arc were prepared.

In Present Invention Example 67, the center distance of the arc from the tool axis was set at 0.03 times the tool diameter, or 0.3 mm, and the main bottom edge was connected to the main peripheral edge, and the sub-bottom edge was connected to the sub-peripheral edge.

In Present Invention Example 68, the center distance of the arc from the tool axis was set at 0.05 times the tool diameter, or 0.5 mm, and the main bottom edge was connected to the main peripheral edge, and the sub-bottom edge was connected to the sub-peripheral edge.

In Present Invention Example 69, the center distance of the arc from the tool axis was set at 0.10 times the tool diameter, or 1.0 mm, and the main bottom edge was connected to the main peripheral edge, and the sub-bottom edge was connected to the sub-peripheral edge.

In Present Invention Example 70, the center distance of the arc from the tool axis was set at 0.15 times the tool diameter, or 1.5 mm, and the main bottom edge was connected to the main peripheral edge, and the sub-bottom edge was connected to the sub-peripheral edge.

In Present Invention Example 71, the center distance of the arc from the tool axis was set at 0.20 times the tool diameter, or 2.0 mm, and the main bottom edge was connected to the main peripheral edge, and the sub-bottom edge was connected to the sub-peripheral edge.

In Present Invention Example 72, the center distance of the arc from the tool axis was set at 0.25 times the tool diameter, or 2.5 mm, and the main bottom edge was connected to the main peripheral edge, and the sub-bottom edge was connected to the sub-peripheral edge.

In Present Invention Example 73, the center distance of the arc from the tool axis was set at 0.3 times the tool diameter, or 3.0 mm, and the main bottom edge was connected to the main peripheral edge, and the sub-bottom edge was connected to the sub-peripheral edge.

In Present Invention Example 74, the center distance of the arc from the tool axis was set at 0.15 times the tool diameter, or 1.5 mm, and the bottom edge and the peripheral edge were connected via a chamfer end cutting edge.

In Present Invention Example 75, the center distance of the arc from the tool axis was set at 0.15 times the tool diameter, or 1.5 mm, and the bottom edge and the peripheral edge were connected via an arc-shaped R edge.

As a method of evaluation, cutting tests similar to that of Example 7 for up to four pockets were performed. As a standard for evaluation, fractures on the tool were observed by the method described in Example 1 after machining two pockets, and those with an abrasion width of less than 0.08 mm at the flank of the bottom edge, without any fractures, were evaluated as Good, and cutting was continued up to four pockets. The test results are shown in Table 8.

TABLE 8

| Sample Number | | Center Distance of Arc | Chamfer End Cutting Edge or R Edge | After Cutting 2 Pockets | | After Cutting 4 Pockets | |
|---|---|---|---|---|---|---|---|
| | | | | Abrasion Width | Fracture | Abrasion Width | Fracture |
| Present Invention Example | 67 | 0.03 times (0.3 mm) | None | 0.072 mm | None | — | Yes |
| | 68 | 0.05 times (0.5 mm) | | 0.041 mm | None | — | Yes |
| | 69 | 0.10 times (1.0 mm) | | 0.039 mm | None | — | Yes |

TABLE 8-continued

| Sample Number | Chamfer End Center Distance of Arc | Chamfer End Cutting Edge or R Edge | After Cutting 2 Pockets Abrasion Width | After Cutting 2 Pockets Fracture | After Cutting 4 Pockets Abrasion Width | After Cutting 4 Pockets Fracture |
|---|---|---|---|---|---|---|
| 70 | 0.15 times (1.5 mm) | | 0.035 mm | None | — | Yes |
| 71 | 0.20 times (2.0 mm) | | 0.038 mm | None | — | Yes |
| 72 | 0.25 times (2.5 mm) | | 0.043 mm | None | — | Yes |
| 73 | 0.30 times (3.0 mm) | | 0.061 mm | None | — | Yes |
| 74 | 0.15 times (1.5 mm) | Chamfer End Cutting Edge | 0.024 mm | None | 0.12 mm | None |
| 75 | | Arc-shaped R Edge | 0.022 mm | None | 0.10 mm | None |

As a result, in Present Invention Examples 67 to 75 the abrasion widths of the flanks of the bottom edge after machining two pockets were all under 0.08 mm and good results without fractures were obtained. Further, in Present Invention Example 74 and Present Invention Example 75, because the bottom edge and the peripheral edge were connected via a chamfer end cutting edge or an arc-shaped R edge, fractures did not occur even after machining four pockets, and extremely good results were obtained.

Example 9

In Example 9, the lengths of the arc-shaped cutting edge of the main bottom edge and the arc-shaped cutting edge of the sub-bottom edge were examined. Specifications of each tool and details of the test were as follows.

In Example 9, Present Invention Examples 76 to 85 were used. As common dimensions of the end mill form, an end mill with a tool diameter D of 10 mm, a core diameter of 7.5 mm, an angle of torsion of the peripheral edge of 20 degrees, a number of cutting edges of 6, a coating of TiSiN-type, and a base material of cemented carbide, was prepared. Further, in Present Invention Examples 76 to 85, the radius of curvature of the arc-shaped cutting edge of the main bottom edge R1 was set at 3.0 times the tool radius, or 15 mm, the undersized amount of the peripheral edge was set at 0.006 times the tool diameter, or 0.06 mm, the maximum undersized amount, which is the largest undersized amount of the bottom edge, was set at 0.007 times the tool diameter, or 0.07 mm, the minimum undersized amount, which is the smallest undersized amount of the bottom edge, was set at 0.007 times the tool diameter, or 0.07 mm, and the position of the center of the arc that constitutes the arc-shaped cutting edge of the main bottom edge was set at 1.5 mm from the tool axis.

In Present Invention Examples 76 to 85, end mills with various lengths of the arc-shaped cutting edge of the main bottom edge and the arc-shaped cutting edge of the sub-bottom edge were prepared.

In Present Invention Example 76, the length of the arc-shaped cutting edge of the main bottom edge was set at 40% of the tool radius, or 2.00 mm, and the length of the arc-shaped cutting edge of the sub-bottom edge was also set at 2.00 mm.

In Present Invention Example 77, the length of the arc-shaped cutting edge of the main bottom edge was set at 50% of the tool radius, or 2.50 mm, and the length of the arc-shaped cutting edge of the sub-bottom edge was also set at 2.50 mm.

In Present Invention Example 78, the length of the arc-shaped cutting edge of the main bottom edge was set at 60% of the tool radius, or 3.00 mm, and the length of the arc-shaped cutting edge of the sub-bottom edge was also set at 3.00 mm.

In Present Invention Example 79, the length of the arc-shaped cutting edge of the main bottom edge was set at 70% of the tool radius, or 3.50 mm, and the length of the arc-shaped cutting edge of the sub-bottom edge was also set at 3.50 mm.

In Present Invention Example 80, the length of the arc-shaped cutting edge of the main bottom edge was set at 80% of the tool radius, or 4.00 mm, and the length of the arc-shaped cutting edge of the sub-bottom edge was also set at 4.00 mm.

In Present Invention Example 81, the length of the arc-shaped cutting edge of the main bottom edge was set at 90% of the tool radius, or 4.50 mm, and the length of the arc-shaped cutting edge of the sub-bottom edge was also set at 4.50 mm.

In Present Invention Example 82, the length of the arc-shaped cutting edge of the main bottom edge was set at 95% of the tool radius, or 4.75 mm, and the length of the arc-shaped cutting edge of the sub-bottom edge was also set at 4.75 mm.

In Present Invention Example 83, the length of the arc-shaped cutting edge of the main bottom edge was set at 80% of the tool radius, or 4.00 mm, and the length of the arc-shaped cutting edge of the sub-bottom edge was set at 85% of the length of the arc-shaped cutting edge of the main bottom edge, or 3.40 mm.

In Present Invention Example 84, the length of the arc-shaped cutting edge of the main bottom edge was set at 80% of the tool radius, or 4.00 mm, and the length of the arc-shaped cutting edge of the sub-bottom edge was set at 90% of the length of the arc-shaped cutting edge of the main bottom edge, or 3.60 mm.

In Present Invention Example 85, the length of the arc-shaped cutting edge of the main bottom edge was set at 80% of the tool radius, or 4.00 mm, and the length of the arc-shaped cutting edge of the sub-bottom edge was set at 95% of the length of the arc-shaped cutting edge of the main bottom edge, or 3.80 mm.

As a method of evaluation, cutting tests similar to that of Example 7 for up to four pockets were performed. As a standard for evaluation, fractures on the tool were observed by the method described in Example 1 after machining two pockets, and those with an abrasion width of less than 0.08 mm at the flank of the bottom edge, without any fractures of the bottom edge, were evaluated as Good, and machining was continued up to four pockets. The test results are shown in Table 9.

The main object materials for the end mill of the present invention are alloy tool steels and high speed steels. Thus, it is most suitable, in particular, for cutting direct machining of molds of high-hardness materials.

TABLE 9

| Sample Number | | Arc-shaped Cutting Edge of Main Bottom Edge | | Arc-shaped Cutting Edge of Sub-bottom Edge | | After Cutting 2 Pockets | | After Cutting 4 Pockets | |
|---|---|---|---|---|---|---|---|---|---|
| | | Length of Arc-shaped Cutting Edge of Main Bottom Edge (mm) | Ratio to Tool Radius (%) | Length of Arc-shaped Cutting Edge of Sub-Bottom Edge (mm) | Ratio to Length of Arc-shaped Cutting Edge of Main Bottom Edge (%) | Abration Width (mm) | Fracture | Abration Width (mm) | Fracture |
| Present Invention Example | 76 | 2.00 | 40 | 2.00 | 100 | 0.072 | None | — | Yes |
| | 77 | 2.50 | 50 | 2.50 | 100 | 0.042 | None | — | Yes |
| | 78 | 3.00 | 60 | 3.00 | 100 | 0.043 | None | — | Yes |
| | 79 | 3.50 | 70 | 3.50 | 100 | 0.038 | None | 0.208 | None |
| | 80 | 4.00 | 80 | 4.00 | 100 | 0.035 | None | 0.192 | None |
| | 81 | 4.50 | 90 | 4.50 | 100 | 0.040 | None | — | Yes |
| | 82 | 4.75 | 95 | 4.75 | 100 | 0.076 | None | — | Yes |
| | 83 | 4.00 | 80 | 3.40 | 85 | 0.079 | None | — | Yes |
| | 84 | 4.00 | 80 | 3.60 | 90 | 0.058 | None | — | Yes |
| | 85 | 4.00 | 80 | 3.80 | 95 | 0.037 | None | 0.195 | None |

As a result, in Present Invention Examples 76 to 85, the abrasion widths of the flanks of the bottom edge after machining two pockets were all under 0.08 mm and good results without fractures were obtained. In particular, in Present Invention Examples 77 to 81, in which the length of the arc-shaped cutting edge of the main bottom edge were 50% or above to 90% or below the tool radius, and in Present Invention Examples 84 to 85, in which the lengths of the arc-shaped cutting edge of the sub-bottom edges were 90% or above to 100% or below the arc-shaped cutting edge of the main bottom edge, the abrasion widths were less than 0.06 mm, and even better results were obtained. Furthermore, in Present Invention Example 79 and 80, in which the length of the arc-shaped cutting edge of the main bottom edge was 70% or above to 80% or under the tool radius, and in Present Invention Example 85, in which the length of the arc-shaped cutting edge of the main bottom edge was 80% of the tool radius, and the length of the arc-shaped cutting edge of the sub-bottom edge was 95% of the length of the arc-shaped cutting edge of the main bottom edge, fractures did not occur even after machining four pockets and especially good results were obtained.

INDUSTRIAL APPLICABILITY

The end mill of the present invention enables the cutting of high-hardness materials with higher efficiency and longer tool life, by the combination of a distinctive bottom edge form and the form of the part connecting the peripheral edge and the bottom edge. Further, the form in which the sub-bottom edge is undersized from the main bottom edge effectively suppresses vibration during cutting, and thereby avoids unexpected fracture and allows a tool life of at least twice or more of conventional forms. The end mill of the present invention enables long-life cutting, even for the roughing of high-hardness materials, without having to worry about fractures, and thus, contributes to the drastic reduction of machining time and tool cost.

DESCRIPTION OF NOTATIONS 1 peripheral edge
2 bottom edge
3 main peripheral edge
4 sub-peripheral edge
5 main bottom edge
6 sub-bottom edge
7 actual thickness of the chip
8 R edge
9 chamfer end cutting edge
11 end mill of the present invention
14 undersized amount of peripheral edge
15 undersized amount of bottom edge
17 center of the arc that constitutes the arc-shaped cutting edge of the main bottom edge
18 center distance of the arc
19 arc-shaped cutting edge of the main bottom edge
20 medium-to-low inclination cutting edge of the main bottom edge
21 arc-shaped cutting edge of the sub-bottom edge
22 medium-to-low inclination cutting edge of the sub-bottom edge
23 conventional radius end mill
24 bottom edge of a conventional radius end mill
25 peripheral edge of a conventional radius end mill
26 center of the arc that constitutes the arc-shaped cutting edge of the sub-bottom edge
27 center of the arc that constitutes the arc-shaped cutting edge of the bottom edge in a conventional radius end mill
28 length of the arc-shaped cutting edge of the main bottom edge
29 length of the arc-shaped cutting edge of the sub-bottom edge
30 connective part of the arc-shaped cutting edge and the medium-to-low inclination cutting edge
31 distance between the center of arc and the connective part
32 arc-shaped cutting edge
33 medium-to-low inclination cutting edge 34 rim at the rearward side of the rotation at the flank of the arc-shaped cutting edge
35 flank of the arc-shaped cutting edge
36 arc formed of the radius of curvature of the arc-shaped cutting edge
37 arc formed of the radius of curvature of the rim at the rearward side of the rotation
38 center of the arc formed of the radius of curvature of the arc-shaped cutting edge
39 center of the arc formed of the radius of curvature of the rim at the rearward side of the rotation
40 intersection
41 conventional end mill
42 boundary of the arc-shaped cutting edge and the medium-to-low inclination cutting edge
43 boundary of the flank of the arc-shaped cutting edge and the flank of the medium-to-low inclination cutting edge
44 flank of the medium-to-low inclination cutting edge
O tool axis
O' tool axis of the end mill when moved for one unit feed rate
D tool diameter
R tool radius
f1 per-edge feed rate when machining a linear or approximately-linear part
f2 per-edge feed rate when machining a corner part
ap axial direction cutting depth
a direction of tool movement
b direction of tool rotation
W work material
R1 radius of curvature of the arc-shaped cutting edge of the main bottom edge
R2 radius of curvature of the arc-shaped cutting edge of the sub-bottom edge
R3 radius of curvature of the arc-shaped cutting edge of the bottom edge
Ra radius of curvature of the arc-shaped cutting edge
Rb radius of curvature of the rim at the rearward side of the rotation
x width of the flank of the arc-shaped cutting edge

The invention claimed is:

1. An end mill comprising:
a bottom edge, which is composed of an arc-shaped cutting edge that is curved when seen from a direction perpendicular to the tool axis and a linear or curved medium-to-low inclination cutting edge that is consecutive to the arc-shaped cutting edge; and
a plurality of peripheral edges each comprising:
a main peripheral edge that is provided at a position that is relatively on the outer peripheral side; and
a sub-peripheral edge that is provided at a position that is relatively on the inner circumference side;
wherein:
when seen from a direction parallel to the tool axis, the arc-shaped cutting edge and a rim at the rearward side of the rotation at a flank of the arc-shaped cutting edge are curved with radii of curvatures, and
the radius of curvature of the arc-shaped cutting edge is smaller than the radius of curvature of the rim at the rearward side of the rotation at the flank of the arc-shaped cutting edge, and
the medium-to-low inclination cutting edge is provided from the boundary of the arc-shaped cutting edge and the medium-to-low inclination cutting edge to the tool axis.

2. The end mill according to claim 1, wherein, when seen from a direction parallel to the tool axis, the radius of curvature of the arc-shaped cutting edge is larger than the tool radius.

3. The end mill according to claim 1, wherein, when seen from a direction parallel to the tool axis, the radius of curvature of the arc-shaped cutting edge is in the range of 0.3 times or above to 0.7 times or below the radius of curvature of the rim at the rearward side of the rotation at the flank of the arc-shaped cutting edge.

4. The end mill according to claim 1, wherein, when seen from a direction parallel to the tool axis, the radius of curvature of the arc-shaped cutting edge is in the range of 1.1 times or above to 1.5 times or below the tool radius.

5. The end mill according to claim 1, wherein, when seen from a direction parallel to the tool axis, the radius of curvature of the rim at the rearward side of the rotation at the flank of the arc-shaped cutting edge is in the range of 2 times or above to 4 times or below the tool radius.

6. An end mill comprising:
a bottom edge, which is composed of an arc-shaped cutting edge that is curved when seen from a direction perpendicular to the tool axis and a linear or curved medium-to-low inclination cutting edge that is consecutive to the arc-shaped cutting edge;
a plurality of peripheral edges each comprising:
a main peripheral edge that is provided at a position that is relatively on the outer peripheral side; and
a sub-peripheral edge that is provided at a position that is relatively on the inner circumference side; and
a plurality of bottom edges each including a main bottom edge with a relatively long length from the tool axis, and a sub-bottom edge with a relatively short length from the tool axis,
wherein:
when seen from a direction parallel to the tool axis, the arc-shaped cutting edge and a rim at the rearward side of the rotation at a flank of the arc-shaped cutting edge are curved with radii of curvatures, and the radius of curvature of the arc-shaped cutting edge is smaller than the radius of curvature of the rim at the rearward side of the rotation at the flank of the arc-shaped cutting edge,
the main bottom edge is composed of an arc-shaped cutting edge that has a radius of curvature that is 1.5 times or above to 5 times or below the tool radius and a medium-to-low inclination cutting edge that stretches from the end of the arc-shaped cutting edge toward the tool axis, and
the sub-bottom edge and the sub-peripheral edge are provided at a direction perpendicular to the tool axis from the main bottom edge and the main peripheral edge, respectively, at a position undersized in the range of 0.0025 times or above to 0.01 times or below the tool diameter.

7. The end mill according to claim 6, wherein the position of the center of the arc that constitutes the arc-shaped cutting edge at the main bottom edge, when seen from a direction perpendicular to the tool axis, is in the range of 0.05 times or above to 0.25 times or below the tool diameter, when measured from the tool axis in a direction perpendicular to the tool axis.

8. The end mill according to claim 6, wherein the ratio of the length of the arc-shaped cutting edge at the bottom edge and the tool radius, when measured at a direction perpendicular to the tool axis, is at least 50% or above to 90% or below the tool radius for the length of the arc-shaped cutting edge of the main bottom edge.

9. The end mill according to claim 6, wherein the radius of curvature of the arc that constitutes the arc-shaped cutting edge at the main bottom edge is equal to the radius of curvature of the arc that constitutes the arc-shaped cutting edge of the sub-bottom edge.

10. The end mill according to claim 1, wherein each bottom edge and peripheral edge are connected via an approximately arc-shaped R edge.

11. The end mill according to claim 10, wherein the radius of curvature of the R edge is in the range of 0.02 times or above to 0.2 times or below the tool radius.

12. An end mill comprising:
 a bottom edge, which is composed of an arc-shaped cutting edge that is curved when seen from a direction perpendicular to the tool axis and a linear or curved medium-to-low inclination cutting edge that is consecutive to the arc-shaped cutting edge; and
 a plurality of peripheral edges each comprising:
 a main peripheral edge that is provided at a position that is relatively on the outer peripheral side; and
 a sub-peripheral edge that is provided at a position that is relatively on the inner circumference side;
 wherein:
  each bottom edge and peripheral edge are connected via a chamfer end cutting edge, and
  when seen from a direction parallel to the tool axis, the arc-shaped cutting edge and a rim at the rearward side of the rotation at a flank of the arc-shaped cutting edge are curved with radii of curvatures, and the radius of curvature of the arc-shaped cutting edge is smaller than the radius of curvature of the rim at the rearward side of the rotation at the flank of the arc-shaped cutting edge.

13. The end mill according to claim 12, wherein the width of the chamfer end cutting edge is in the range of 0.02 times or above to 0.2 times or below the tool radius.

* * * * *